US012609489B2

(12) United States Patent
Shinyama et al.

(10) Patent No.: US 12,609,489 B2
(45) Date of Patent: Apr. 21, 2026

(54) CONNECTOR HAVING TERMINALS PROVIDING IMPROVED SHIELDING EFFECT

(71) Applicant: MOLEX, LLC, Lisle, IL (US)

(72) Inventors: Makoto Shinyama, Yamato (JP); Nobuyuki Kondo, Yamato (JP)

(73) Assignee: Molex, LLC, Lisle, IL (US)

( * ) Notice: Subject to any disclaimer, the term of this patent is extended or adjusted under 35 U.S.C. 154(b) by 290 days.

(21) Appl. No.: 18/277,067

(22) PCT Filed: Mar. 8, 2022

(86) PCT No.: PCT/IB2022/052017
§ 371 (c)(1),
(2) Date: Aug. 12, 2023

(87) PCT Pub. No.: WO2022/195401
PCT Pub. Date: Sep. 22, 2022

(65) Prior Publication Data

US 2024/0128686 A1 Apr. 18, 2024

(30) Foreign Application Priority Data

Mar. 18, 2021 (JP) ................................ 2021-044367

(51) Int. Cl.
*H01R 13/6471* (2011.01)
*H01R 12/71* (2011.01)
*H01R 13/6582* (2011.01)

(52) U.S. Cl.
CPC ....... *H01R 13/6471* (2013.01); *H01R 12/712* (2013.01); *H01R 13/6582* (2013.01); *H01R 12/716* (2013.01)

(58) Field of Classification Search
CPC .............. H01R 13/6471; H01R 12/714; H01R 12/716; H01R 12/57
USPC .............................................. 439/74, 66, 65
See application file for complete search history.

(56) References Cited

U.S. PATENT DOCUMENTS 7,168,986 B1 1/2007 Peng
10,084,265 B2 * 9/2018 Ozeki ............... H01R 13/6594
(Continued)

FOREIGN PATENT DOCUMENTS

CN 106410460 A 2/2017
CN 110380289 A 10/2019
(Continued)

OTHER PUBLICATIONS

International Preliminary Report on Patentability received for PCT Application No. PCT/IB2022/052017, mailed on Sep. 28, 2023, 8 pages.

(Continued)

*Primary Examiner* — Marcus E Harcum

(57) ABSTRACT

The present disclosure includes: a connector body; and a terminal attached to the connector body, the connector being mated with a counterpart connector, wherein the connector body includes a recessed groove part and a pair of side walls extending in a longitudinal direction of the connector body, arranged in parallel demarcating both sides of the recessed groove part, the terminals are arranged with a plurality along each wall forming a pair of terminal group rows in parallel, where ground terminals included in each terminal group row are arranged in mutually facing positions, at least one ground terminal included in each terminal group row includes a board connecting part positioned to the inside of the connector body in the width direction and a board connecting part positioned to the outside of the connector in the width direction, and the board connecting part positioned on the inside is longer than the board connecting part positioned on the outside.

16 Claims, 12 Drawing Sheets

(56) References Cited

U.S. PATENT DOCUMENTS

| | | | | |
|---|---|---|---|---|
| 10,644,420 | B1 * | 5/2020 | Ishida | H01R 13/11 |
| 11,509,083 | B2 * | 11/2022 | Lee | H01R 12/79 |
| 11,522,309 | B2 * | 12/2022 | Yanase | H01R 13/193 |
| 11,527,847 | B2 * | 12/2022 | Oosaka | H01R 13/518 |
| 11,563,288 | B2 * | 1/2023 | Oosaka | H01R 13/518 |
| 11,569,599 | B2 * | 1/2023 | Hayashi | H01R 12/73 |
| 11,721,922 | B2 * | 8/2023 | Mamuro | H01R 13/6471 439/607.05 |
| 11,901,658 | B2 * | 2/2024 | Jodo | H01R 13/6473 |
| 12,218,451 | B2 * | 2/2025 | Mamuro | H01R 13/6581 |
| 2017/0033479 | A1 | 2/2017 | Ozeki | |
| 2018/0198241 | A1 | 7/2018 | Ooi | |
| 2019/0348780 | A1 * | 11/2019 | Kitazawa | H01R 13/6587 |
| 2020/0220306 | A1 | 7/2020 | Kodama | |
| 2021/0218200 | A1 * | 7/2021 | Shimomura | H01R 13/6594 |
| 2023/0246359 | A1 * | 8/2023 | Suzuki | H01R 12/716 439/74 |
| 2023/0335930 | A1 * | 10/2023 | Morita | H01R 13/405 |

FOREIGN PATENT DOCUMENTS

| | | | |
|---|---|---|---|
| CN | 212485720 | U | 2/2021 |
| JP | 2020021697 | A | 2/2020 |
| JP | 2020021722 | A | 2/2020 |
| JP | 2020107472 | A | 7/2020 |
| JP | 2020149926 | A | 9/2020 |
| KR | 20200117687 | A | 10/2020 |
| WO | 2020116149 | A1 | 6/2020 |
| WO | 2020196681 | A1 | 10/2020 |
| WO | 2020218385 | A1 | 10/2020 |
| WO | 2021070761 | A1 | 4/2021 |

OTHER PUBLICATIONS

International Search Report and Written Opinion received for PCT Application No. PCT/IB2022/052017, mailed on Jun. 10, 2022, 09 pages.

* cited by examiner

X
Y
Z
11
11a
11b
12
12a
13
13a
13b
14
15
18
21
21b
21c
22
22a
23a
52
52a
52b
52c
52e
52g
53
53a
53b
53c
53d
53f
56
56a
56b
56d
56f
61
62

Prior art

CONNECTOR HAVING TERMINALS PROVIDING IMPROVED SHIELDING EFFECT

RELATED APPLICATION

This application is a U.S. National Phase Patent Application of International Patent Application No. PCT/IB2022/052017, filed on Mar. 8, 2022, which claims priority to Japanese Patent Application No. 2021-044367 filed on Mar. 18, 2021, both of which are incorporated herein by reference in their entireties.

TECHNICAL FIELD

The present disclosure relates to a connector.

BACKGROUND ART

Conventionally, connectors such as board to board connectors have been used to electrically connect pairs of parallel circuit boards to each other. Such connectors are attached to each of opposing surfaces of the pair of circuit boards, and mated together to secure electric conduction. Furthermore, in order to prevent crosstalk between signal terminals, technology has been proposed in which a ground connection fitting is provided between the signal terminals (for example, see Patent Document 1).

FIG. 12 is an exploded perspective view illustrating a conventional board to board connector prior to mating.

In the drawings, 811 is a receptacle housing of the receptacle connector 810 as a connector mounted on a surface of the circuit board P, and 851 is a receptacle reinforcement fitting attached to both ends of the receptacle housing 811 in the longitudinal direction, and is connected by soldering or the like to a connection pad coupled to the ground trace of the circuit board P.

A plurality of receptacle signal terminals 861 are mounted forming a row on both left and right sides of the receptacle housing 811. Each of the receptacle signal terminals 861 are connected using soldering or the like to a connection pad connected to a signal trace of the circuit board P. Note that the outer side of the side wall portion on both the left and right sides of the receptacle housing 811 is covered by a connecting plate 852 that mutually connects receptacle reinforcement fittings 851 mounted to both ends in the longitudinal direction.

In addition, an elongated plate shaped ground connection fitting 856 extending in the longitudinal direction of the receptacle housing 811 is arranged between the rows of receptacle signal terminals 861 aligned on both the left and right sides. The ground connection fitting 856 is connected to a connection pad connected to the ground trace of the circuit board P by soldering or the like, and is also mechanically and electrically connected to the receptacle reinforcement fitting 851.

On the other hand, in the figure, 911 is a plug housing of a plug connector 910 as a connector mounted on the surface of a second circuit board (not shown), and 951 is a plug reinforcement fitting attached to both ends of the plug housing 911 in the longitudinal direction and is connected to the connection pad connected to the ground trace of the second circuit board by soldering or the like.

Further, a plurality of plug signal terminals 961 are mounted in a row on each of the side walls on both left and right sides of the plug housing 911, and each of the plug signal terminals 961 is connected to the connection pad coupled to a signal trace on the second circuit board by soldering or the like.

Furthermore, the plug connector 910 is displaced in the drawings to show the arrow Q and is mated with the receptacle connector 810. In a state where the receptacle connector 810 and the plug connector 910 are mated, the receptacle housing 811 and the plug housing 911 are mated to each other, and the mutually corresponding receptacle signal terminals 861 and the plug signal terminals 961 are in contact with each other and conduct. The receptacle reinforcement fitting 851 and the plug reinforcement fitting 951 are in contact and conduct, and further, the ground connection fitting 856 and the plug reinforcement fitting 951 are in contact and conduct. As a result, the receptacle signal terminals 861 and the plug signal terminals 961 on both sides facing each other are shielded by the plate type ground connection fitting 856 and in cases where signals are transferred between the mutually corresponding receptacle signal terminals 861 and plug signal terminals 961, crosstalk is prevented between the receptacle signal terminals 861 and plug signal terminals 961.

Prior Art Documents: Patent Documents: Patent Document 1 Japanese Unexamined Patent Application 2020-021697

SUMMARY

However, in a conventional connector, since the ground connection fittings 856 are only arranged between the rows on the left and right sides of the receptacle signal terminals 861 and plug signal terminals 961, preventing crosstalk between receptacle signal terminals 861 and plug signal terminals 961 that are in the same row is difficult. In a case that the signal transmitted between the mutually corresponding receptacle signal terminals 861 and the plug signal terminals 961 is a high-frequency signal, cross-talk is particularly difficult to prevent.

Here, an object of the present disclosure is to solve the problems of the known connector, and to provide a highly reliable connector that has a high shielding effect and reliably reduces crosstalk.

To achieve this a connector includes:

a connector body; and a terminal attached to the connector body, the connector being mated with a counterpart connector, wherein the connector body includes a recessed groove part and a pair of side walls extending in a longitudinal direction of the connector body arranged in parallel, demarcating both sides of the recessed groove part, the terminals are arranged with a plurality along each wall forming a pair of terminal group rows in parallel, where ground terminals included in each terminal group row are arranged in mutually facing positions, at least one ground terminal included in each terminal group row includes a board connecting part positioned to the inside of the connector body in the width direction and a board connecting part positioned to the outside of the connector in the width direction, and the board connecting part positioned on the inside is longer than the board connecting part positioned on the outside.

Another connector further includes:

a reinforcement fitting mounted on the connector body, wherein the reinforcement fitting functions as a ground terminal positioned on both ends of each terminal group row with regards to the longitudinal direction of the connector body, and terminals positioned on both ends of each terminal group row are high frequency signal terminals.

In still another connector, when viewed in the longitudinal direction of the connector body, the terminals have a winding shape that proceeds from the outside of the connector body in the width direction towards the inside and then winds around, and ground terminals including a board connecting part positioned on the inside of the connector body in the width direction and a board connecting part positioned on the outside of the connector body in the width direction have a different winding direction of the winding shape than other terminals included in the terminal group row.

In still another connector:

the mating connector includes a mating connector body, a mating terminal attached to the mating connector body, and a mating shield member, the mating connector body includes a pair of mating side walls extending in the longitudinal direction of the mating connector body, a plurality of mating terminals are arranged along each of the mating connector side wall parts and are formed as a parallel pair of mating terminal group rows, and the mating shield member extends in a longitudinal direction of the mating connector body and is positioned between the mating terminal group rows.

In still another connector:

in a state of the mating connector and the connector being mated, the mating shield member is positioned between mutually facing board connecting parts positioned on the inside of the connector body in the width direction when viewed in the longitudinal direction of the mating connector body and the connector.

The connector according to the present disclosure has a high shielding effect and reliably reduces crosstalk to improve reliability.

DETAILED DESCRIPTION OF THE PREFERRED EMBODIMENTS

Embodiments will hereinafter be described in detail with reference to the drawings.

Figure 1:
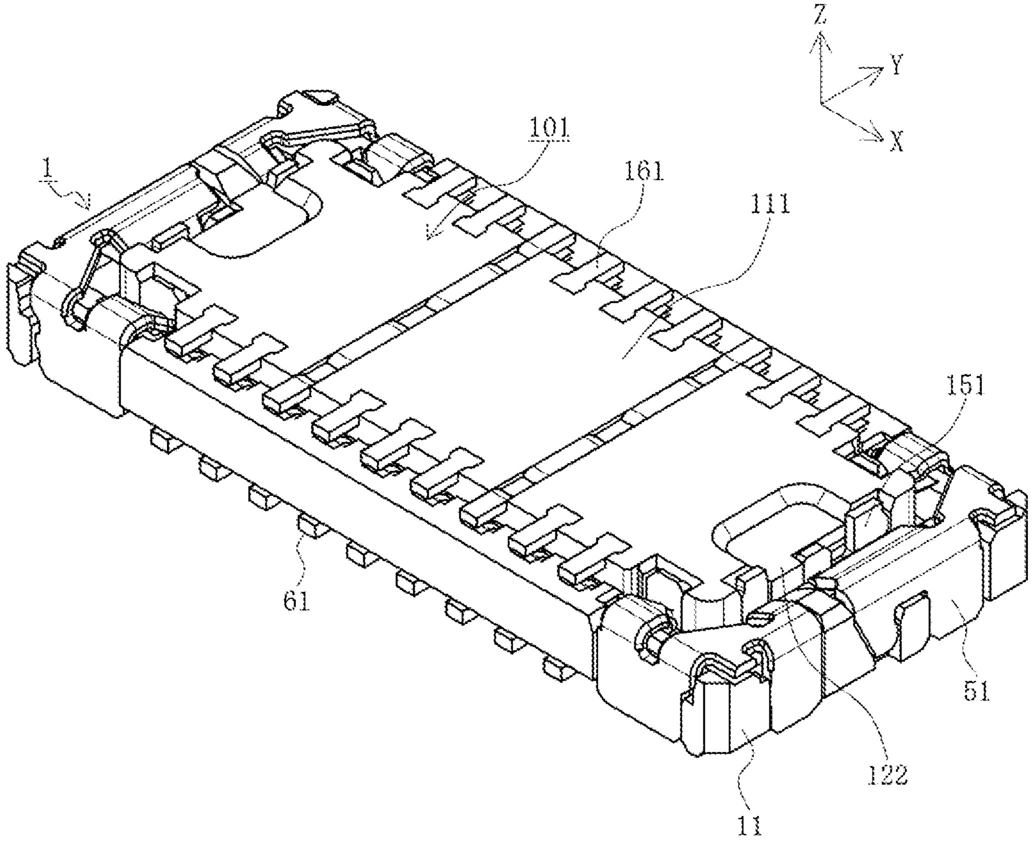
FIG. 1 is a perspective view illustrating the state where a first connector and a second connector are mated together according to the present embodiment.
Figure 2A:
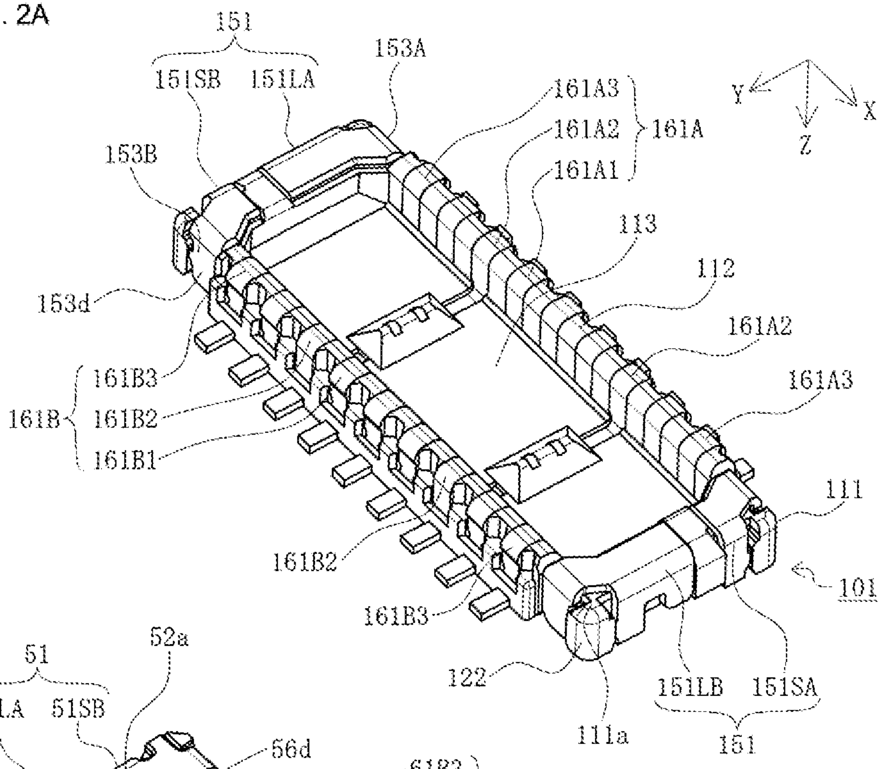
FIG. 2 is a perspective view prior to mating of the first connector to the second connector according to the present embodiment, where (a) is a perspective view of the second connector as viewed from the mating surface and (b) is a perspective view of the first connector as viewed from the mating surface.
Figure 2B:
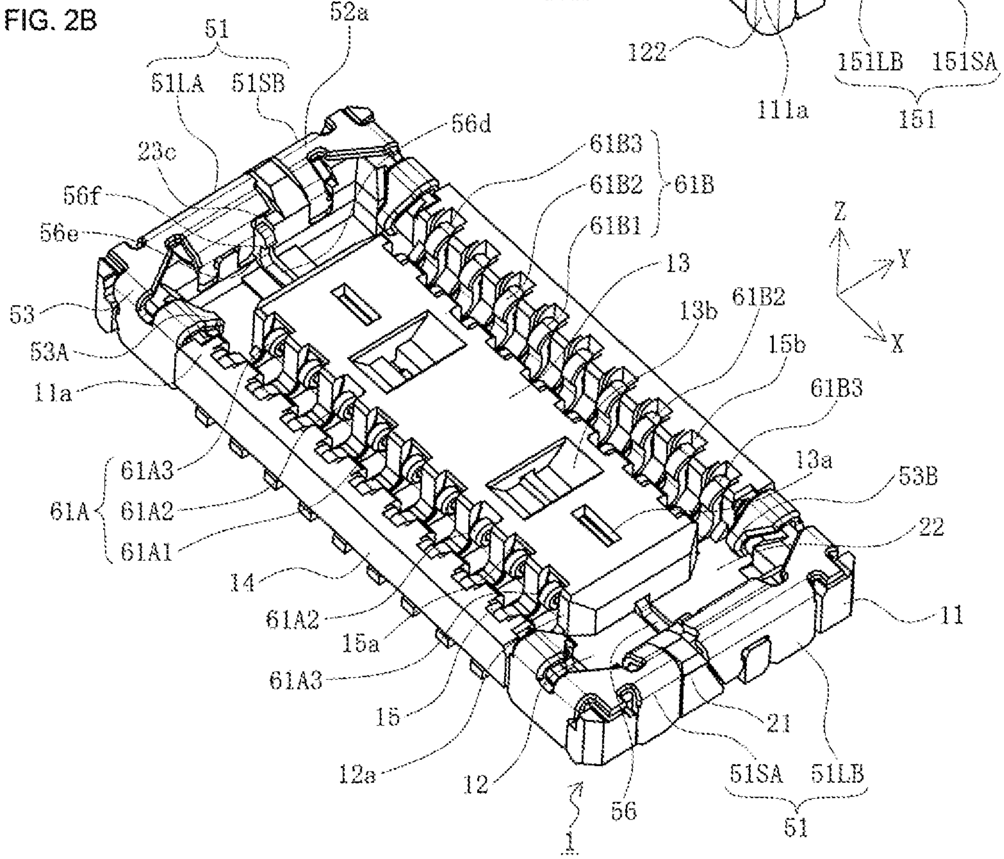
Figures 3A, 3B, 3C, 3D:
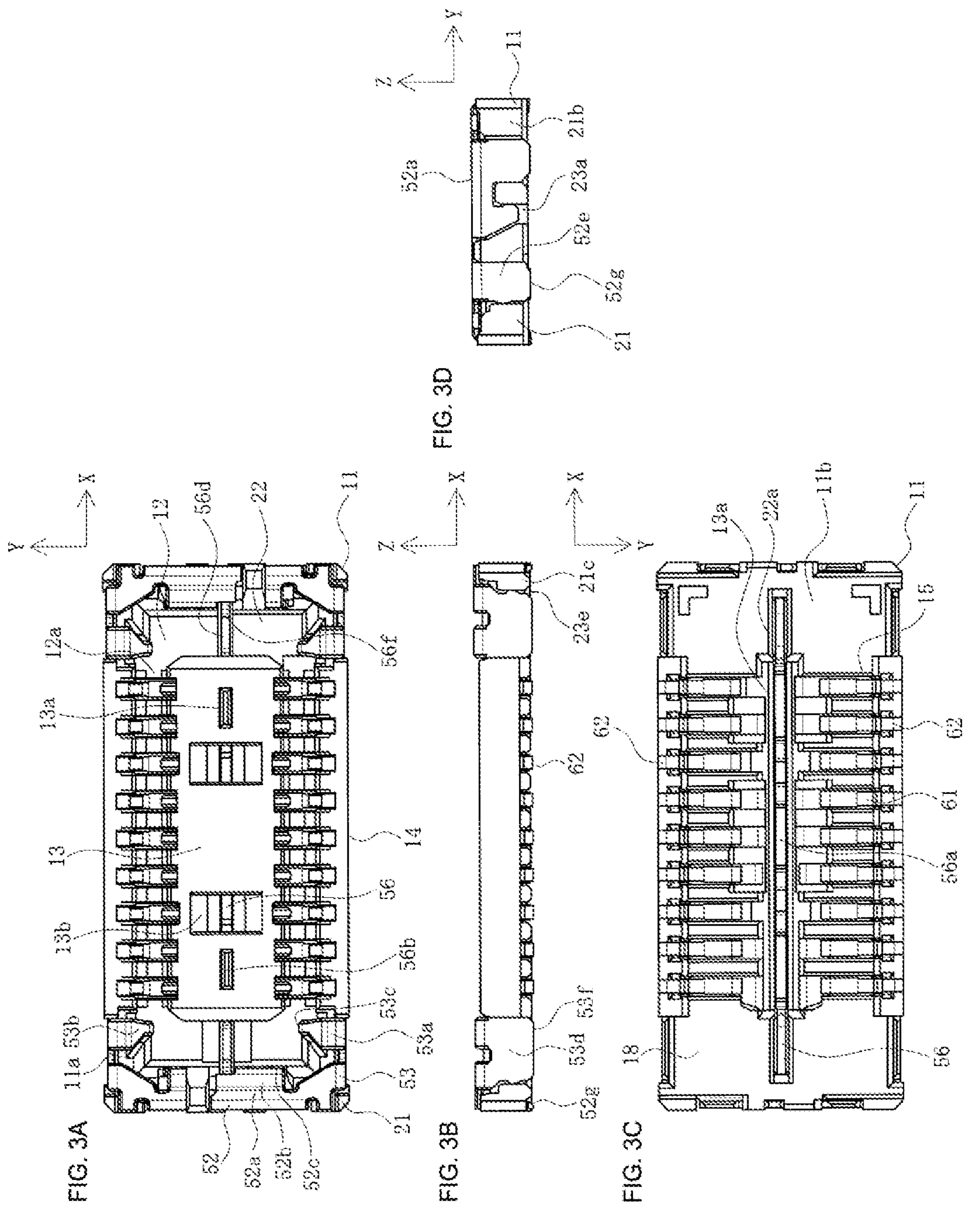
FIG. 3 is a four-plane diagram of a first connector according to the present embodiment, where (a) is a plan view, (b) is a side surface view, (c) is a bottom view, and (d) is a front view.
Figures 4A, 4B, 4C:
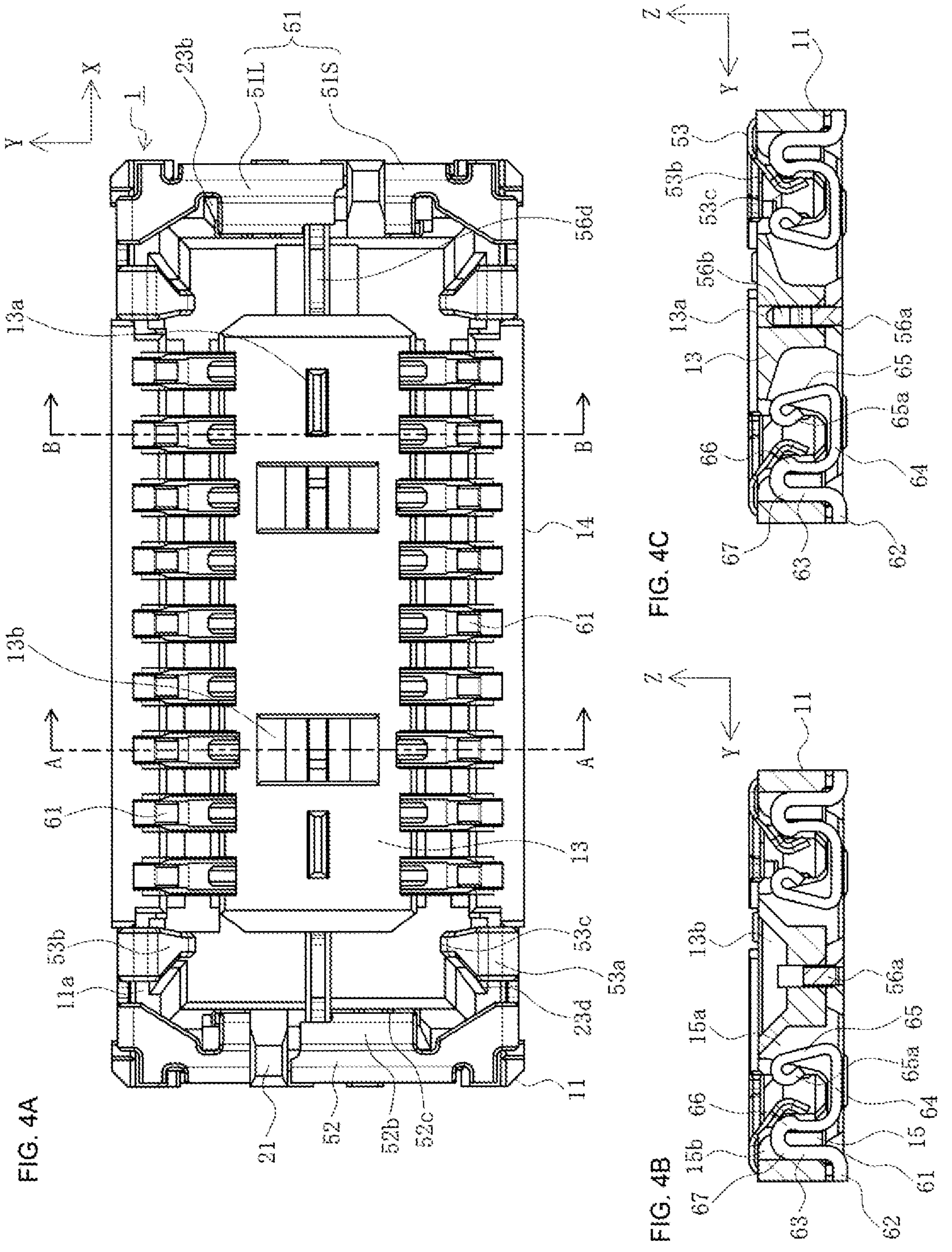
FIG. 4 is a cross-sectional view of the first connector according to the present embodiment, where (a) is a plan view, (b) is a sectional view taken along the A-A line in (a), and (c) is a sectional view taken along the B-B line in (a).
Figure 5:
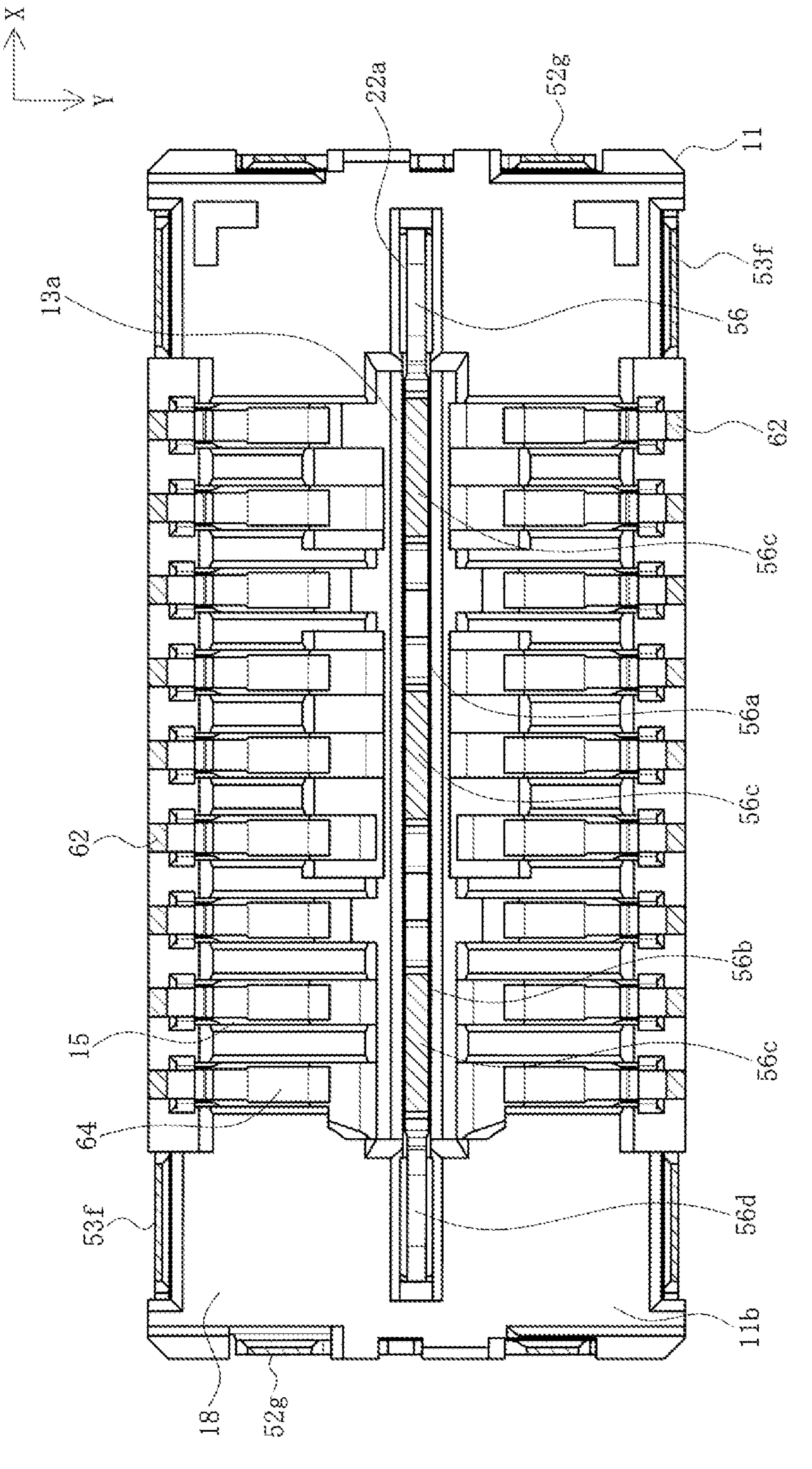
FIG. 5 is a bottom view illustrating the first connector solder location according to the present embodiment.

FIG. 1 is a perspective view illustrating the state where a first connector is mated with a second connector according to the present embodiment, FIG. 2 is a perspective view illustrating the state before mating of the first connector with the second connector according to the present embodiment, FIG. 3 is a four-plane diagram illustrating the first connector according to the present embodiment, FIG. 4 is a plan view and cross-sectional view illustrating the first connector according to the present embodiment, and FIG. 5 is a bottom view illustrating the solder locations of the first connector according to the present embodiment. Note that, in FIG. 2, (a) is a perspective view of the second connector as viewed from the mating surface, (b) is a perspective view of the first connector from the mating surface. In FIG. 3, (a) is a plan view, (b) is a side view, (c) is bottom view, and (d) is a front view. In FIG. 4, (a) is a plan view, (b) is a sectional view taken along the line A-A in (a), and (c) is a sectional view taken along the line B-B in (a).

In the figures, 101 is a connector according to the present embodiment, which is a second connector in one of a pair of connectors that is a connector assembly. The second connector 101 is a surface-mounted connector mounted on the surface of a second substrate that is a mounting member (not illustrated), and is mated with a first connector 1 that is a counterpart connector. The first connector 1 is the other of the pair of connectors, and is a surface-mounted connector mounted on the surface of a first substrate that is a mounting member (not illustrated).

The first connector 1 and the second connector 101 according to the present embodiment are preferably used to electrically connect the first substrate to the second substrate, but can also be used to electrically connect other members. For example, the first substrate and the second substrate are each a printed circuit board, a flexible flat cable (FFC), a flexible circuit board (FPC) or the like as used in electronic devices or the like, but may be any type of substrate.

In addition, in the present embodiment, expressions indicating direction such as top, bottom, left, right, front, rear, and the like used to describe the configuration and operation of each part of the first connector 1 and the second connector 101 are relative rather than absolute and are appropriate when each part of the first connector 1 and the second connector 101 are in the positions illustrated in the drawings; that said, these directions should be interpreted as changing in accordance with the change in position when the position thereof is changed.

The first connector 1 has a first housing 11 that is a counterpart connector body integrally formed of an insulating material such as synthetic resin. As illustrated in the figures, the first housing 11 has a substantially rectangular thick plate-like shape that is a substantially rectangular parallelepiped, and a first recess 12 mated with a second housing 111 of the second connector 101, which is a substantially rectangular recess surrounded at the periphery thereof, on the side at which the second connector 101 is mated, namely, on the side of a mating surface 11*a* (the side in the negative Z-axis direction). Furthermore, a first protrusion 13 that is a middle island to be mated with a recessed groove part 113 formed on a mating surface 111*a* of the second connector 101 is formed in the first recess 12 to be integral with the first housing 11.

Further, first side wall parts 14 that are counterpart side walls extending parallel to a first protrusion 13 and defining both sides of the first recess 12 are formed on both sides (the positive and negative Y-axis directions) of the first protrusion 13 integrally with the first housing 11. The first protrusion 13 and the first side wall parts 14 protrude upward (Z-axis negative direction) from a bottom plate 18 defining a bottom surface of the first recess 12, and extend in the longitudinal direction of the first housing 11. Consequently, as a part of the first recess 12, recessed groove parts 12*a* that are elongated recesses extending in the longitudinal direction of the first housing 11 are formed on both sides of the first protrusion 13.

first terminal housing cavities 15 are formed from both side surfaces of the first protrusion 13 to bottom surfaces of the recessed groove parts 12*a*. In the illustrated example, the first terminal housing cavities 15 pass through the bottom plate 18 in the plate-thickness direction (Z-axis direction). Note that, out of the first terminal housing cavities 15, recessed grooves formed on both side surfaces of the first protrusion 13 are referred to as first terminal housing inner cavities 15*a*, and recessed grooves formed on side surfaces of the first side wall parts 14, which are opposed to the first protrusion 13, are referred to as first terminal housing outer cavities 15*b*.

In the present embodiment, the plurality of (nine in the illustrated example) first terminal housing cavities 15 are formed on both sides of the first protrusion 13 at a predetermined pitch so as to form two rows in the longitudinal direction of the first housing 11. The pitch and the number of the first terminal housing cavities 15 can be changed as appropriate. The same number of first terminals 61 as the first terminal housing cavities, which are counterpart terminals housed in the respective first terminal housing cavities 15 and loaded into the first housing 11, are also disposed on both sides of the first protrusion 13 at a similar pitch. A plurality of first terminals 61 are arranged along each first side wall part 14 and a parallel pair of terminal group rows (mating terminal group rows) are formed.

Note that, although the first terminals 61 included in each terminal group row are all the same, in the present embodiment, as illustrated in FIG. 2, an identifiable sign may be given thereto according to the disposed position for sake of convenience, and a description may be made using the sign. Moreover, note that the second terminals 161 of the second connector 101 are all the same, but like the first terminal 61, an identifiable sign may be given thereto according to the disposed position for sake of convenience, and a description may be made using the sign.

In the example shown in the drawing, the first terminals 61 positioned on the right side of the first housing 11 in the width direction (Y-axis negative direction) are collectively called the first terminal 61A. In the first terminal 61A group, terminals that are used as normal signal terminals connected to normal signal lines that carry normal frequencies (for example, frequency less than 10 GHz) or as ground terminals connected to a ground line are suitably called first terminal 61A1. Terminals used only as ground terminals connected to ground lines are suitably called first terminal 61A2. Terminals used as high frequency signal terminals connected to high frequency signal lines that transmit high frequencies (for example, frequencies of 10 GHz or higher) such as RF signals are suitably called first terminal 61A3. The first terminal 61A1 can also be used as a power supply terminal, if necessary. Furthermore, in the example illustrated in the drawing, in the row of the first terminal 61A extending in the longitudinal direction of the first housing 11, the first terminal 61A arranged at both ends of the row is the first terminal 61A3 used as the high frequency signal terminal, and the first terminal 61A arranged at the third position from both ends is the first terminal 61A2 that is only used as the ground terminal, and the other first terminal 61A is the first terminal 61A1 used as a normal signal terminal or a ground terminal.

In addition, in the example shown in the drawing, the first terminals 61 positioned on the left side of the first housing 11 in the width direction (Y-axis positive direction) are collectively called the first terminal 61B. In the first terminal 61B group, terminals that are used as normal signal terminals connected to normal signal lines that carry normal frequencies (for example, frequency less than 10 GHz) or as ground terminals connected to a ground line are suitably called first terminal 61B1. Terminals used only as ground terminals connected to ground lines are suitably called first terminal 61B2. Terminals used as high frequency signal terminals connected to high frequency signal lines that transmit high frequencies (for example, frequencies of 10 GHz or higher) such as RF signals are suitably called first terminal 61B3. The first terminal 61B1 can also be used as a power supply terminal, if necessary. Furthermore, in the example illustrated in the drawing, in the row of the first terminal 61B extending in the longitudinal direction of the first housing 11, the first terminal 61B arranged at both ends of the row is the first terminal 61B3 used as the high frequency signal terminal, and the first terminal 61B arranged at the third position from both ends is the first terminal 61B2 that is only used as the ground terminal, and the other first terminal 61B is the first terminal 61B1 used as a normal signal terminal or a ground terminal.

Thus, in the example shown in the drawing, the first terminal 61A1, the first terminal 61A2, and the first terminal 61A3, in the row of the first terminal 61A positioned on the right side in the width direction of the first housing 11 and the first terminal 61B1, the first terminal 61B2, and the first terminal 61B3 in the row of the first terminal 61B positioned on the left side in the width direction of the first housing 11 are positioned mutually facing each other. The normal signal terminals, the ground terminals, and the high frequency signal terminals are in line symmetrically arranged in plan view with the centerline of the width direction (Y-axis direction) extending in the longitudinal direction (X-axis direction) of the first connector 1 (first housing 11) as an axis of symmetry.

Furthermore, for the second terminals 161, groups corresponding to the first terminals 61A and the first terminals 61B are collectively referred to as second terminals 161A and second terminals 161B, respectively, and in the group of second terminals 161A, terminals corresponding to the first terminal 61A1, the first terminal 61A2, and the first terminal 61A3 are individually referred to as a second terminal 161A1, a second terminal 161A2, and a second terminal 161A3, respectively, and in the group of second terminals 161B, terminals corresponding to the first terminal 61B1, the first terminal 61B2 and the first terminal 61B3 are individually referred to as a second terminal 161B1, a second terminal 161B2, and a second terminal 161B3, respectively.

The first terminal 61 is a member integrally formed by performing processing such as punching and bending on a conductive metal plate, and includes a held part 63, a tail part 62 as a board connecting part connected to the lower end of the held part 63, an upper connecting part 67 connected to the upper end of the held part 63, an outer contact part 66 connected to the lower end of the upper connecting part 67 and opposed to the held part 63, a lower connection part 64 connected to the lower end of the outer contact part 66, and an inner connection part 65 connected to an end of the lower connection part 64 on the opposite side to the outer contact part 66.

The held part 63 is a portion that is mated in and held by the first terminal housing outer cavity 15*b* while extending in the vertical direction (Z-axis direction), namely, in the thickness direction of the first housing 11. Note that the first terminal 61 is not necessarily attached to the first housing 11 by press fitting, but may be integrated with the first housing 11 by overmolding or insert molding. Here, for convenience of description, only the case in which the held part 63 is pressed into and held by the first terminal housing outer cavity 15*b* will be described.

The tail part 62 is bent and connected to the held part 63 and extends in a left-right direction (Y-axis direction), namely, outward in the width direction of the first housing 11, while the bottom surface thereof (Z-axis negative direction side surface) is connected to the connection pad coupled to the conductive trace of the first substrate by soldering. Note that in the example illustrated in the drawings, the tip of the tail part 62 (the outer end in the width direction of the first housing 11) is flush with the side surface of the first housing 11 (outer surface of the first side wall part 14), but may be positioned outside the side surface, or may be positioned inside the side surface.

The upper connecting part 67 is a portion that is curved by about 180 degrees so as to protrude upward (Z-axis positive direction). The outer contact part 66 extending downward (Z-axis negative direction) is connected to the lower end of the upper connecting part 67 on the opposite side to the held part 63. A part of the outer contact part 66 desirably protrudes inward in the width direction of the first housing 11.

The lower connection part 64 is a portion including a substantially U-shaped side surface connected to the lower end of the outer contact part 66. An inner contact part 65*a* curved by about 180 degrees is connected to the upper end of the inner connection part 65 so as to protrude upward and toward the outer contact part 66.

The first terminal 61 is mated in the first terminal housing cavity 15 from the side of the mounting surface 11*b* that is a lower surface (a surface in the Z-axis negative direction) of the first housing 11, and the held part 63 is sandwiched from both the sides by the side walls of the first terminal housing outer cavity 15 *b* formed on the inner side surface of the first side wall part 14, whereby the first terminal 61 is fixed to the first housing 11. In this state, namely, in the state in which the first terminal 61 is loaded into the first housing 11, the inner contact part 65*a* and the outer contact part 66 are positioned on the right and left sides of the recessed groove part 12 *a* and face each other. In addition, when viewed from the longitudinal direction of the first housing 11, most of the held part 63 is housed in the first terminal housing outer cavity 15 *b*, and most of the inner contact part 65*a* is housed in the first terminal housing inner cavity 15 *a*. Furthermore, the lower surface of the tail part 62 is positioned below the mounting surface 11*b* (the lower surface of the bottom plate 18).

The first terminal 61 is a member integrally formed by processing such as punching or bending a metal plate, and thus has a certain degree of elasticity. As is clear from the shape, an interval between the inner contact part 65*a* and the outer contact part 66 facing each other can be elastically changed. That is, when the second terminal 161 included in the second connector 101 is inserted between the inner contact part 65*a* and the outer contact part 66, the interval between the inner contact part 65*a* and the outer contact part 66 is elastically elongated.

A first protruding end part 21 as a fitting guide is disposed on each of both longitudinal ends of the first housing 11. The mating recess 22 is formed as part of the first recess 12 in each first protruding end part 21. The mating recess 22 is a substantially rectangular recess, and is connected to both the ends in the longitudinal direction of each recessed groove part 12*a*. With the first connector 1 and second connector 101 mated, the second protruding end part 122 and second sidewall part 112 of the second housing 111 of the second connector 101 are inserted into the mating recess 22 and into the recessed groove part 12*a*.

Furthermore, a shield plate housing slit 13*a*, which is a slit-shaped recessed groove extending in the longitudinal direction (X-axis direction) and the vertical direction (Z-axis direction) is formed in the center in the width direction (Y-axis direction) of the first protrusion 13. The shield plate housing slit 13*a* continuously opens to the lower surface of the bottom plate 18 and opens separately to the upper surface of the first protrusion 13. Note that, with the upper surface of the first protrusion 13 of the shield plate housing slit 13*a*, the recessed part 13*b* recessed downward is formed in a position corresponding to the first terminal 61A2 and the first terminal 61B2 with respect to the longitudinal direction, and the shield plate housing slit 13*a* is also open on the bottom surface of the recessed part 13*b*. The shield plate housing slit 13*a* is connected to a horizontal arm housing slit 22*a* formed in the bottom plate 18 of the mating recess 22. The horizontal arm housing slit 22*a* is formed so as to penetrate through the bottom plate 18 in the thickness direction (Z-axis direction). Furthermore, the horizontal arm housing slit 22*a* is connected to a vertical arm housing slit 23*c* formed in a first end wall 21*b* of the first protruding end part 21.

The shield plate housing slit 13*a*, the horizontal arm housing slit 22*a*, and the vertical arm housing slit 23*c* house and hold a shield plate 56 that is a band-like plate material and mating shield member for the opposing connector extending in the thickness direction (Z-axis direction) and the lengthwise direction of the first housing 11, which is formed by performing machining such as punching on a conductive metal plate. The shield plate 56 includes a narrow main body part 56*a* that extends in the longitudinal direction of the first connector 1 (first housing 11), a held part 56*b* that protrudes upwards from the upper edge of the main body part 56*a*, a plurality of connecting feet parts 56*c* that protrude downward from the bottom edge of the main body part 56*a*, a pair of elongated horizontal arms 56*d* extending in the longitudinal direction of the first housing 11 from both longitudinal edges of the main body part 56*a*, vertical arms 56*e* extending upward (Z-axis positive direction) from the distal ends of each of the elongated horizontal arms 56*d*, and engaging protrusions 56*f* that protrude from near the upper edges of each of the vertical arms 56*e* toward the main body part 56*a*. The elongated horizontal arm 56*d* and the vertical arm 56*e* are elastically deformable and function as spring members, so that the engaging protrusions 56*f* are resiliently displaceable away from the main body part 56*a*. Furthermore, when the shield plate 56 is inserted or press-fit from the bottom surface of the bottom plate 18 into the shield plate housing slit 13*a*, the held part 56*b* penetrates into a part of the shield plate housing slit 13*a* positioned below an opening in the upper surface of the first protrusion 13 and engages. As a result, the shield plate 56 is housed and held in the shield plate housing slit 13*a*. The elongated horizontal arm 56*d* and the vertical arm 56*e* are housed in the horizontal arm housing slit 22*a* and the vertical arm housing slit 23*c*, respectively.

Note that the shield plate 56 is not necessarily attached to the first housing 11 by insertion or press fit, and may be integrated with the first housing 11 by overmolding or insert molding. Here, for convenience of description, only the case in which the shield plate is housed in the shield plate housing slit 13*a* and attached to the first housing 11 by insertion or press fitting is described.

When the shield plate 56 is attached to the first housing 11 in this way, the shield plate 56 is positioned between the two rows of first terminals 61 arranged along the left and right recessed groove parts 12*a*. In more detail, when viewed from above, the shield plate 56 is positioned along the centerline of the width direction (X-axis direction) extending in the longitudinal direction of the first connector 1 (first housing 11) effectively preventing crosstalk between the two rows of first terminals 61. Note that, with the shield plate 56 attached to the first housing 11, on the side of the mating surface 11*a*, the main body part 56*a* is positioned below the upper surface of the first protrusion 13, and the elongated horizontal arms 56*d* and the vertical arms 56*e* each do not protrude from the bottom plate 18 and the first end wall 21*b* into the mating recess 22, however, at least tips of the engaging protrusions 56*f* protrude from the first end wall 21*b* into the mating recess 22. In addition, regarding the mounting surface 11*b*, the elongated horizontal arms 56*d* do not protrude below the mounting surface 11*b* (bottom surface of bottom plate 18) but the bottom surface of the connecting feet parts 56*c* is positioned lower than the mounting surface 11*b* (bottom surface of bottom plate 18).

The first protruding end part 21 includes first side wall extensions 21*c* that are counterpart fitting guide side walls extending in the longitudinal direction of the first housing 11 from both longitudinal ends of the first side wall part 14, and a first end wall 21*b* extending in the width direction of the first housing 11, both ends of the first end wall 21*b* being connected to the first side wall extensions 21*c*. In each first protruding end part 21, the first end wall 21*b* and the first side wall extensions 21*c* connected to both the ends of the first end wall 21*b* form a continuous and substantially U-shaped side wall and define three sides of the substantially rectangular mating recess 22. In the first end wall 21*b*, an outer end recessed part 23*a* is formed on the outer surface, and an inner end recessed part 23*b* is formed on the inner surface. In the first side wall extension 21*c*, an outer recessed part 23*e* is formed on the outer surface, and an inner recess 23*d* is formed on the inner surface.

A first reinforcement fitting 51 that is a counterpart reinforcement fitting is attached to the first housing 11. In the present embodiment, the first reinforcement fittings 51 are members integrally formed by performing processing such as punching or bending on the metal plate, are located on both longitudinal ends in the longitudinal direction (X-axis direction) of the first housing 11, and each include a first end wall cover 52 that covers the outside of the first end wall 21*b* of the first protruding end part 21, and a first side wall cover 53 that covers the first side wall extension 21*c*, which are substantially L-shaped in plan view.

Further, as illustrated in FIG. 4, the first reinforcement fitting 51 includes a large first reinforcement fitting 51L in which the first end wall cover 52 covers a region of half of the first end wall 21*b* or more, and a small first reinforcement fitting 51S in which the first end wall cover 52 covers a region less than half of the first end wall 21*b*. Note that, for the first side wall cover 53, the large first reinforcement fitting 51L and the small first reinforcement fitting 51S have similar dimensions and configurations, and for the first end wall cover 52, the large first reinforcement fitting 51L and the small first reinforcement fitting 51S have almost similar dimensions and configurations except for the dimensions of the first housing 11 in the width direction. Therefore, when the large first reinforcement fitting 51L and the small first reinforcement fitting 51S are collectively described, they are described as merely the first reinforcement fitting 51.

Note that the pair of large first reinforcement fittings 51L and the pair of small first reinforcement fittings 51S are disposed to be opposed to each other on a diagonal of the substantially rectangular first housing 11 in plan view. Moreover, the large first reinforcement fittings 51L are all the same, and the small first reinforcement fittings 51S are all the same. Note that in the present embodiment, as illustrated in FIG. 2, an identifiable sign may be given depending on the disposed position for sake of convenience, and a description may be made using the sign. Additionally, it should be noted that, for the second reinforcement fitting 151 of the second connector 101, like the first reinforcement fitting 51, an identifiable sign may be given thereto depending on the disposed position for sake of convenience, and a description may be made using the sign.

In the example illustrated in the drawing, of the first reinforcement fitting 51 located on the right side in the width direction (the Y-axis negative direction) of the first housing 11, the reinforcement fitting located at a corner on the near side in the longitudinal direction (X-axis negative direction side) of the first housing 11 is the large first reinforcement fitting 51L, which is referred to as first reinforcement fitting 51LA, and the reinforcement fitting located at a corner on the back side in the longitudinal direction (X-axis positive direction side) of the first housing 11 is the small first reinforcement fitting 51S, which is referred to as first reinforcement fitting 51SA. Furthermore, of the first reinforcement fitting 51 located on the left side in the width direction (the Y-axis positive direction) of the first housing 11, the reinforcement fitting located at a corner on the near side in the longitudinal direction of the first housing 11 is the small first reinforcement fitting 51S, which is referred to as first reinforcement fitting 51SB, and the reinforcement fitting located at a corner on the back side in the longitudinal direction of the first housing 11 is the large first reinforcement fitting 51L, which is referred to as first reinforcement fitting 51LB. Furthermore, the second reinforcement fittings 151 corresponding to the first reinforcement fitting 51LA, the first reinforcement fitting 51SA, the first reinforcement fitting 51SB, and the first reinforcement fitting 51LB are referred to as a second reinforcement fitting 151LA, a second reinforcement fitting 151SA, a second reinforcement fitting 151SB, and a second reinforcement fitting 151LB, respectively.

The first end wall cover 52 includes an upper surface portion 52*a* that extends in the width direction of the first housing 11 and covers an upper surface 21*a* of the first end wall 21*b*, an inclined inner cover portion 52*b* as a guiding portion extending obliquely downward from the inner edge of the first end wall 21*b* on the upper surface portion 52*a*, a vertical inner cover portion 52*c* that extends downward from a lower end of the inclined inner cover portion 52*b*, an outer cover portion 52*e* that extends downward from the outer edge of the first end wall 21*b* on the upper surface portion 52*a*, and connecting feet parts 52*g* at the lower end of the outer cover portion 52*e*.

The first side wall cover 53 includes an upper surface portion 53*a* that extends in the longitudinal direction of the first housing 11 and covers the upper surface of the first side wall extension 21*c*, an inclined elastic arm 53*b* that is a counterpart reinforcement fitting terminal extending diagonally downward from the inner edge of the first side wall extension 21*c* on the upper surface portion 53*a*, a contact protrusion 53*c* that bulges toward the center of the mating recess 22 in the vicinity of the lower end of the inclined elastic arm 53*b*, an outer cover portion 53*d* that extends downward from an outer edge of the first side wall extension 21*c* on the upper surface portion 53*a*, and connecting feet parts 53*f* at the lower end of the outer cover portion 53*d*.

The inclined inner cover portion 52*b*, the vertical inner cover portion 52 *c*, the outer cover portion 52*e*, and the outer cover portion 53*d* in the first reinforcement fitting 51 are inserted or press-fitted into the inner end recess part 23*b* and the outer end recessed part 23*a* of the first end wall 21*b* and the outer recessed part 23*e* of the first side wall extension 21*c* from the side of the mating surface 11*a* that is the upper surface (the surface in the Z-axis positive direction) of the first housing 11, and attached to the first housing 11. Note that the first reinforcement fitting 51 is not necessarily attached to the first housing 11 by insertion or press fit, and may be integrated with the first housing 11 by overmolding or insert molding. Here, for convenience of description, only the case in which the shield plate is attached to the first housing 11 by insertion or press fitting is described.

Moreover, with the first reinforcement fitting 51 attached to the first housing 11, the upper surface portion 52*a* of the first end wall cover 52 covers a majority of the upper surface of the first end wall 21*b*. The inclined inner cover portion 52*b* and the vertical inner cover portion 52 *c* are at least partially housed in the inner end recess part 23*b*, the engaging projection enters into a part of the side surface of the inner end recess part 23*b* and engages therewith, the outer cover portion 52*e* is at least partially housed in the outer end recessed part 23*a*, the engaging projection enters into a part of the side surface of the outer end recess part 23*a* and engages therewith, and the lower surface of the connecting feet parts 52*g* is positioned below the mounting surface 11*b* (the lower surface of the bottom plate 18) and is substantially flush with the lower surface of the tail part 62 of the first terminals 61. Also, the upper surface portion 53*a* of the first side wall cover 53 covers a majority of the upper surface of the first side wall extension 21*c*, the inclined elastic arm 53*b* is housed in the inner recess 23*d* with at least a portion thereof spaced apart from a bottom surface of the inner recess 23*d*, the contact protrusion 53*c* is elastically displaceable toward the first side wall extension 21*c*, the outer cover portion 53*d* is at least partially housed in the outer recessed part 23*e*, the engaging projection enters into a part of the side surface of the outer recess part 23*e* and engages therewith, and the lower surface of the connecting feet parts 53*f* is positioned below the mounting surface 11*b* and is substantially flush with the lower surface of the tail part 62 of the first terminal 61.

As described above, since a majority of the surface of the first protruding end part 21 is covered with the first reinforcement fitting 51, the strength of the first protruding end part 21 increases, and even when a force or impact is applied to the first protruding end part 21 in the operation of fitting the first connector 1 and the second connector 101 together, damage or deformation of the first protruding end part 21 can be reliably prevented.

Note that the upper surface portion 52*a* of the first end wall cover 52 of the large first reinforcement fitting 51L extends toward the first side wall extension 21*c* on the opposite side, and the distal end thereof reaches a position beyond the center of the first housing 11 in the width direction. Thus, the vertical arm 56*e* of the shield plate 56 disposed at the center of the first housing 11 in the width direction is positioned below the upper surface portion 52*a* of the first end wall cover 52 of the large first reinforcement fitting 51L. However, the vertical arm 56*e* of the shield plate 56 does not contact or interfere with any portion of the first reinforcement fitting 51. As described above, since the first reinforcement fitting 51 attached to both longitudinal ends of the first housing 11, and the shield plate 56 that extends in the longitudinal direction of the first housing 11 and reaches the first end walls 21*b* at both ends of the first housing 11 are independent from each other, the first housing 11 can deform somewhat flexibly as a whole, and be prevented from breaking or deforming at application of a force or impact.

The inclined elastic arm 53*b* is elastically deformable, and the contact protrusion 53*c* formed near the tip of the inclined elastic arm 53*b* functions as a terminal in contact with the outer cover portion 153*d* of the second reinforcement fitting 151 for electrical conduction. In other words, the inclined elastic arm 53*b* is provided with the same function as the first terminal 61. Thus, it should be noted that, for the inclined elastic arm 53*b* like the first terminal 61, as illustrated in FIG. 2, an identifiable sign may be given thereto depending on the disposed position, and a description may be made using the sign.

In the example illustrated in the drawing, the inclined elastic arm 53*b* positioned on the right side of the first housing 11 in the width direction is called a first reinforcement fitting terminal 53A and the inclined elastic arm 53*b* positioned on the left side of the first housing 11 in the width direction is called a first reinforcement fitting terminal 53B. Furthermore, in the example illustrated in FIG. 2, the first reinforcement fitting terminal 53A and the first reinforcement fitting terminal 53B can suitably be used for ground terminals connected to ground lines. Furthermore, in the outer cover portion 153*d* of the second reinforcement fitting 151, fittings corresponding to the first reinforcement fitting terminal 53A and the first reinforcement fitting terminal 53B are referred to as a second reinforcement fitting terminal 153A and a second reinforcement fitting terminal 153B. Furthermore, in the example illustrated in FIG. 2, the second reinforcement fitting terminal 153A and the second reinforcement fitting terminal 153B can suitably be used for ground terminals connected to ground lines.

Similar to the tail part 62 of the first terminal 61, the connecting feet parts 52*g* of the first end wall cover 52 and the connecting feet parts 53*f* of the first side wall cover 53 are connected to connection pads connected to the conductive trace of the first substrate by soldering or the like. As a result, similar to the first terminal 61, the inclined elastic arm 53*b* of the first reinforcement fitting 51 can also function as a terminal for transmitting a current or electrical signal, suitably as a ground terminal for connecting to ground lines, and the number of poles of the first connector 1 can be increased without increasing the number of first terminals 61, reducing the first connector 1 in size. In addition, because the shield plate 56 extending in the longitudinal direction of the first housing 11 is disposed between two rows of first terminals 61 in the width direction of the first housing 11, crosstalk between the two rows of first terminals 61 is effectively prevented.

Next, the configuration of the second connector 101 will be described.

Figures 6A, 6B, 6C, 6D:
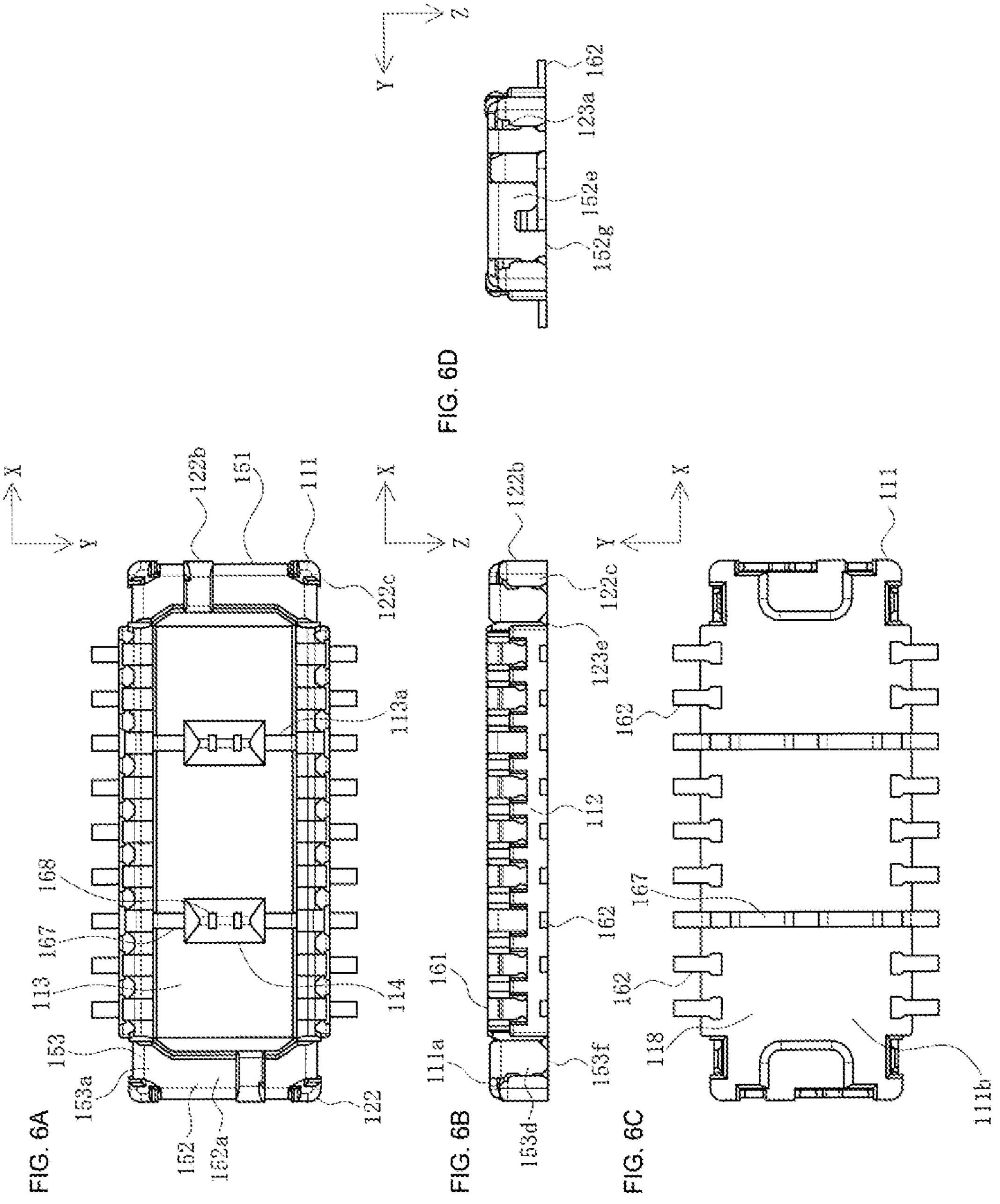
FIG. 6 is a four-plane diagram of a second connector according to the present embodiment, where (a) is a plan view, (b) is a side surface view, (c) is a bottom view, and (d) is a front view.
Figure 7A:
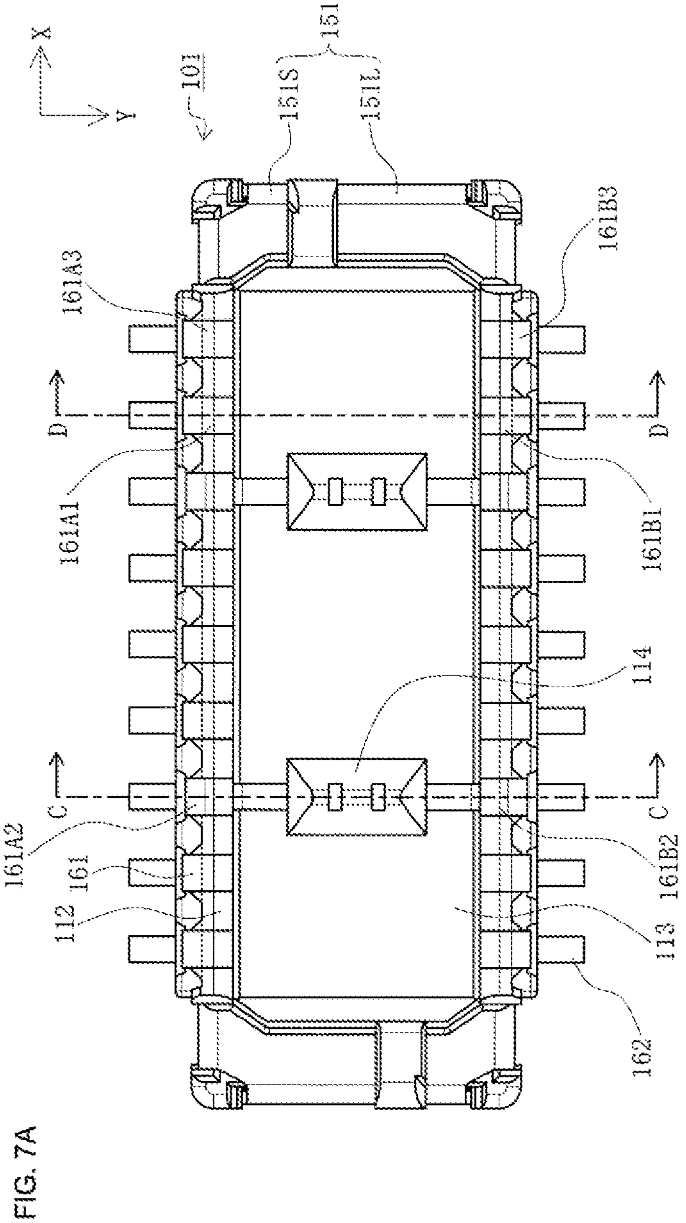
FIG. 7 is a cross-sectional view of the second connector according to the present embodiment, where (a) is a plan view, (b) is a sectional view taken along the C-C line in (a), and (c) is a sectional view taken along the D-D line in (a).
Figure 7C:
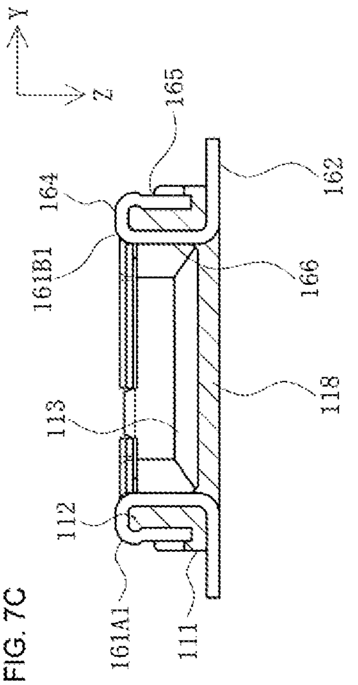
Figure 7B:
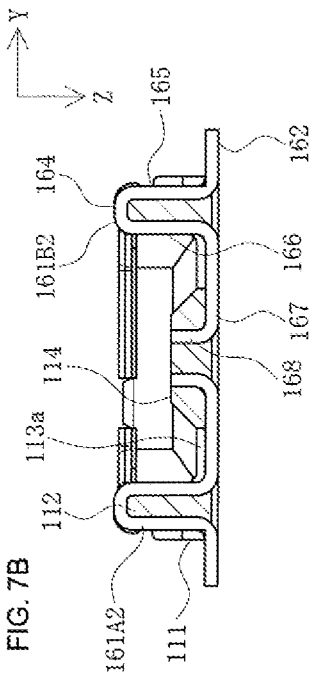
Figure 8:
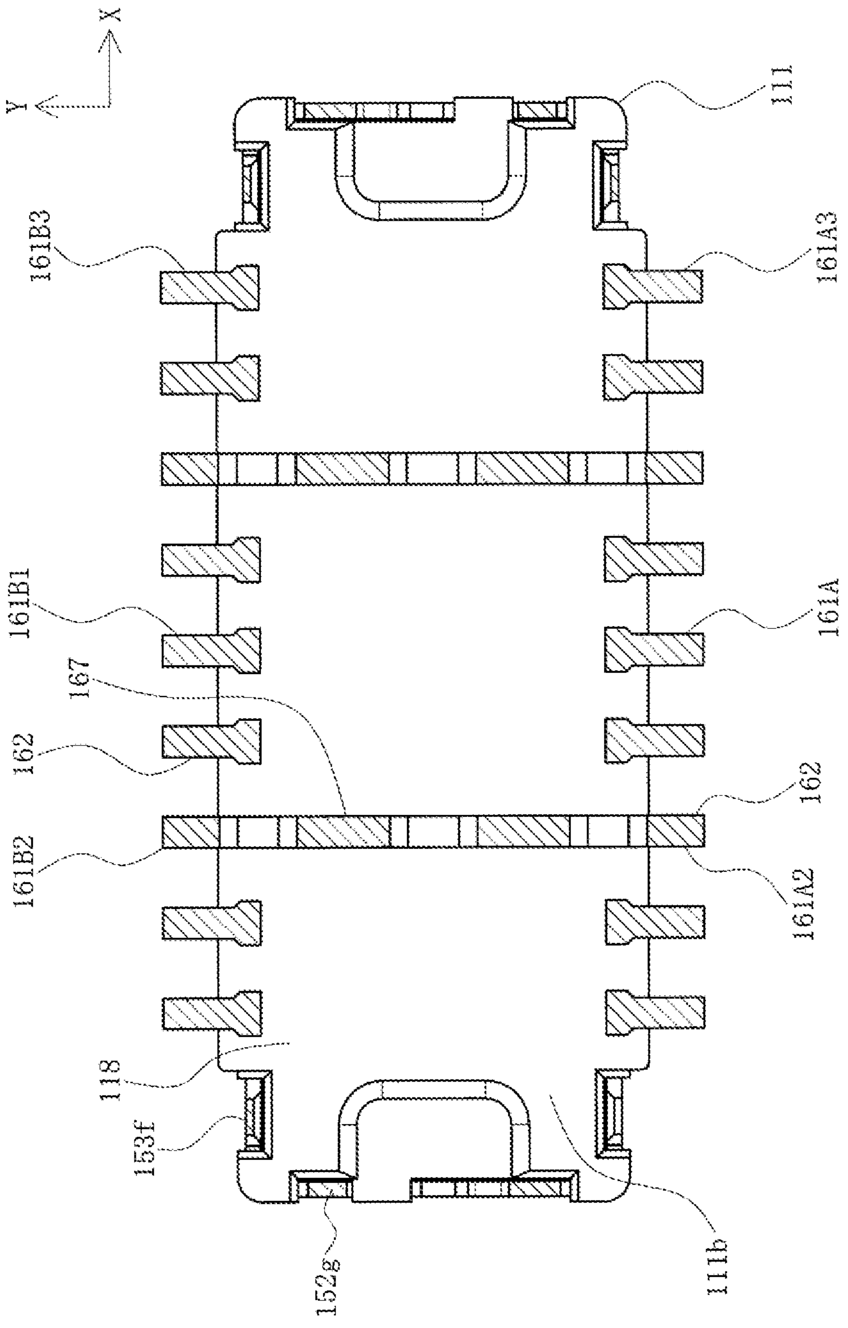
FIG. 8 is a bottom view illustrating the second connector solder location according to the present embodiment.

FIG. 6 is a four-plane diagram of the second connector of the present embodiment. FIG. 7 is a plan view and cross-sectional view of the second connector according to the present embodiment. FIG. 8 is a bottom view illustrating the soldering locations of the second connector of the present embodiment. Note, in FIG. 6 (a) is a plan view, (b) is a side view, (c) is a bottom view, and (d) is a front view. In FIG. 7, (a) is a plan view, (b) is a sectional view taken along the line C-C in (b), and (c) is a sectional view taken along the line D-D in (c).

The second connector 101 that is a connector according to the present embodiment has a second housing 111 that is a connector body integrally formed of an insulating material such as synthetic resin. As illustrated in the figure, the second housing 111 has a substantially rectangular thick plate-like shape that is a substantially rectangular parallelepiped. A recessed groove part 113 that extends in the longitudinal direction (X-axis negative direction) of the second housing 111, second sidewall part 112 that are elongated protrusions defining both sides of the recessed groove part 113 in the width direction (Y-axis direction) and extending in the longitudinal direction of the second housing 111, and second protruding end parts 122 that define both ends of the recessed groove part 113 in the longitudinal direction (X-axis direction) and extend in the width direction (Y-axis direction) of the second housing 111 to function as fitting guides coupling both longitudinal ends of the second sidewall part 112 are integrally formed on the side mated into the first connector 1 of the second housing 111, namely, on the side of the mating surface 111*a* (the side in the Z-axis negative direction).

The second sidewall parts 112 are formed in parallel along both sides of the recessed groove part 113 and along both sides of the second housing 111. The second terminals 161 as terminals are disposed on each of the second sidewall part 112. The same number of second terminals 161 as the first terminals 61 are disposed at a pitch corresponding to the first terminals 61. In other words, a plurality of the second terminals 161 are arranged along each second sidewall part 112 forming a pair of terminal group rows that are parallel. In addition, in the recessed groove part 113, the side mounted on the second substrate, in other words, mounting surface 111*b* (the side in a positive Z-axis direction) is closed by a bottom plate 118.

Note, the second terminals 161 included in each terminal group row are nearly identical for the second terminals 161 but in the present embodiment, as indicated above, groups corresponding to the first terminals 61A and the first terminals 61B are collectively referred to as second terminal 161A and second terminal 161B, respectively, and in the group of second terminals 161A, terminals corresponding to the first terminal 61A1, the first terminal 61A2, and the first terminal 61A3 are individually referred to as a second terminal 161A1, a second terminal 161A2, and a second terminal 161A3, respectively, and in the group of second terminals 161B, terminals corresponding to the first terminal 61B1, first terminal 61B2 and first terminal 61B3 are individually referred to as a second terminal 161B1, a second terminal 161B2, and a second terminal 161B3, respectively.

Furthermore, in the example illustrated in the drawing, in the row of the second terminal 161A extending in the longitudinal direction of the second housing 111, the second terminal 161A arranged at both ends of the row is the second terminal 161A3 used as the high frequency signal terminal, and the second terminal 161A arranged at the third position from both ends is the second terminal 161A2 that is only used as the ground terminal, and the other second terminal 161A is the second terminal 161A1 used as the normal signal terminal or the ground terminal. The second terminal 161A1 can also be used as a power supply terminal, if necessary. In addition, in the row of the second terminal 161B extending in the longitudinal direction of the second housing 111, the second terminal 161B arranged at both ends of the row is the second terminal 161B3 used as the high frequency signal terminal, and the second terminal 161B arranged at the third position from both ends is the second terminal 161B2 that is only used as the ground terminal, and the other second terminal 161B is the second terminal 161B1 used as the normal signal terminal or the ground terminal. The second terminal 161B1 can also be used as a power supply terminal, if necessary. In the example illustrated in the drawings, the normal signal terminal, the ground terminal, and the high frequency signal terminal in the left and right columns are arranged on a line symmetric with the center line in the width direction (Y-axis direction) extending in the longitudinal direction (Y-axis direction) of the second connector 101 (second housing 111) in a plan view as the axis of symmetry.

All second terminals 161 are members integrally formed by carrying out processing such as punching and bending on a conductive metal plate. The second terminals 161 may be integrated with the second housing 111 by over-molding or insert molding. That is, the second housing 111 is molded by filling a cavity of a mold in which the second terminals 161 are set in advance with an insulating material such as a synthetic resin. As a result, the second terminals 161 are at least partially embedded in the second housing 111 and are integrally attached to the second housing 111. Note that the second terminals 161 are not necessarily integrated with the second housing 111 by overmolding or insert molding, but may be attached to the second housing 111 by press fitting or the like. Here, for convenience of description, only a case in which the second housing 111 is integrated by overmolding or insert molding will be described.

Additionally, in the second terminal 161 disposed along each second side wall part 112, the second terminal 161A1 and the second terminal 161B1, used as the normal signal terminal, and the second terminal 161A3 and the second terminal 161B3 used as the high frequency signal terminal are all the same, but the second terminal 161A2 and second terminal 161B2 used as the ground terminal are slightly different from the second terminal 161A1 and the second terminal 161B1, and the second terminal 161A3 and the second terminal 161B3.

Specifically, as illustrated in FIG. 7, the second terminal 161A1 and the second terminal 161B1, as well as second terminal 161A3 and second terminal 161B3, all have an outer contact part 165, an upper connecting part 164 connected to the top (end in the negative direction of the Z-axis) of this outer contact part 165, an inner contact part 166 connected to the upper connecting part 164 that extends parallel to the outer contact part 165, and a tail part 162 connected to the bottom (end in the positive direction of the Z-axis) of the inner contact part 166 as a board connecting part.

The outer contact part 165 is at least partially exposed on a surface of the second sidewall part 112, which faces the outer side of the second housing 111 in the width direction. Furthermore, the upper connecting part 164 is exposed on the upper surface (Z-axis negative direction) of the second sidewall part 112, and is substantially flush with the surface. Furthermore, the inner contact part 166 is exposed on the surface facing the inner side of the second housing 111 in the width direction, and is substantially flush with the surface. The tail part 162 extends from the lower end of the surface facing the outer side of the second sidewall part 112 in the width direction of the second housing 111 toward the outer side of the second housing 111 in the width direction and the bottom surface thereof (Z-axis side surface in the positive direction) is connected to a connection pad coupled to a conductive trace of the second substrate by soldering. Furthermore, as illustrated in FIG. 7(*c*), the elongated band material constituting the second terminal 161 extends from the tip of the tail part 162 (the outer end in the width direction of the second housing 111) at an approximately 90 degrees to the surface facing the inner side in the width direction of the second housing 111 in the second side wall part 112, and subsequently, extends at an approximately 90 degree angle from the lower end of the inner contact part 166, and then the upper connecting part 164 extends toward the outside in the width direction of the second housing 111, bends approximately 90 degrees, and is then bent so as to extend from the top toward the bottom of the outer contact part 165. In other words, the second terminal 161A1 and the second terminal 161B1, as well as the second terminal 161A3 and the second terminal 161B3, as viewed from the longitudinal direction of the second housing 111, have a winding shape that proceeds inwards from the outside in the width direction of the second housing 111 and then winds around in a winding shape that winds upward and then winds back.

In contrast, the second terminal 161A2 and the second terminal 161B2 include an outer contact part 165, an upper connecting part 164, an inner contact part 166, and a tail part 162 and in addition an inner extending part 167, which functions as a board connecting part, and an upward projecting piece 168. In other words, the second terminal 161A3 and the second terminal 161B3 include two board connecting parts, the tail part 162 and the inner extending part 167. The bottom surface (Z-axis positive side) of the tail part 162 and the inner extending part 167 are connected by soldering to connection pads connected to conductive traces of the second board. Note that when the tail part 162 and the inner extending part 167 as the board connecting parts are mutually identified, they are called the outer board connecting part and the inner board connecting part.

The outer contact part 165 extends so the lower end thereof reaches the proximity of the lower end of the second sidewall part 112, and the tail part 162 is connected to the lower end of the outer contact part 165. Additionally, the inner extending part 167 is connected to the lower end of the inner contact part 166 and extends from the lower end thereof toward the inner side in the width direction of the second housing 111, and the upward projecting piece 168 is connected to the leading end thereof. The upward projecting piece 168 is a member that extends upwardly, the upper end thereof being positioned above the upper surface of the recessed groove part 113 and below the upper surface of the second sidewall part 112.

Note that, on the upper surface of the recessed groove part 113, a protrusion 114 protruding upward is formed at a location corresponding to the upward projecting piece 168 of the second terminal 161A2 and the second terminal 161B2. The upper end of the upward projecting piece 168 is housed in the protrusion 114, and the upper end surface of the upward projecting piece 168 is substantially flush with the upper end surface of the protrusion 114. Additionally, as illustrated in FIG. 7(*b*), the protrusion 114 has a substantially trapezoidal cross-section in the Y-axis direction. This allows the insulating material such as the synthetic resin constituting the second housing 111 to flow smoothly during overmolding or insert molding. Furthermore, the protrusion 114 is housed in the recessed part 13*b* formed in the first protrusion 13 of the first housing 11 in a state where the first connector 1 and the second connector 101 are mated. Note that, on the upper surface of the recessed groove part 113, an elongated open part 113*a* in which an upper end is open is formed above the inner extending part 167 between the second sidewall part 112 and the protrusion 114, and an upper surface of the inner extending part 167 is exposed.

As illustrated in FIG. 7(*b*), the elongated band material constituting the second terminal 161A2 and the second terminal 161B2 extends from the tip of the tail part 162 (the outer end in the width direction of the second housing 111) to the surface facing the outer side in the width direction of the second housing 111 in the second sidewall part 112, is bent approximately 90 degrees, extends from the bottom to the top of the outer contact part 165, and is bent approximately 90 degrees at the upper end thereof. The upper connecting part 164 extends toward the inside of the second housing 111 in the width direction, is bent approximately 90 degrees, extends from the top to the bottom of the inner contact part 166, and is bent approximately 90 degrees at the upper end thereof. The inner extending part 167 extends towards the inside of the second housing 111 in the width direction and is bent. In other words, the second terminal 161A2 and the second terminal 161B2, as viewed from the longitudinal direction of the second housing 111, have a winding shape that proceeds inwards from the outside in the width direction of the second housing 111 and then winds around and a winding shape that winds upward and then winds forward. In other words, the second terminal 161A2 and the second terminal 161B2 have different winding directions of the winding shape than the second terminal 161A1, the second terminal 161B1, the second terminal 161A3, and the second terminal 161B3.

Note that in the example illustrated in the drawings, the tip of the tail part 162 of the second terminal 161A2 and the second terminal 161B2 is positioned outside the side surface of the second housing 111 (the outer surface of the second side wall part 112), but may be flush with the side surface and the leading end may be soldered, and bent inward.

Further, in the second protruding end part 122 of the second housing 111, a recessed outer end recessed part 123*a* is formed on an end side surface 122*b* that faces outward in the longitudinal direction of the second housing 111, and a recessed outer recessed part 123*e* is formed on a side surface 122*c* that faces outward in the width direction of the second housing 111.

A second reinforcement fitting 151 that is a reinforcement fitting mounted thereto is attached to the second housing 111. In the present embodiment, the second reinforcement fittings 151 are members integrally formed by performing processing such as punching or bending on the metal plate, and are located at both longitudinal ends of the second housing 111, and each include a second end wall covering part 152 that covers a majority of the upper surface and the end side surface 122*b* of the second protruding end part 122, and a second side wall covering part 153 that is connected to the side end of the second end wall covering part 152 and covers a majority of the side surface 122*c*.

Further, the second reinforcement fitting 151 includes a large second reinforcement fitting 151L in which the second end wall covering part 152 covers a region of a half of the second protruding end part 122 or more, and a small second reinforcement fitting 151S in which the second end wall covering part 152 covers a region less than a half of the second protruding end part 122. Note that, for the second side wall covering part 153, the large second reinforcement fitting 151L and the small second reinforcement fitting 151S have a similar dimension and configuration, and for the second end wall covering part 152, the large second reinforcement fitting 151L and the small second reinforcement fitting 151S have an almost similar dimension and configuration except for the dimension of the second housing 111 in the width direction. Therefore, when the large second reinforcement fitting 151L and the small second reinforcement fitting 151S are collectively described, they are described as merely the second reinforcement fitting 151.

Note that the pair of large second reinforcement fittings 151L and the pair of small second reinforcement fittings 151S are disposed to be opposed to each other on a diagonal of the substantially rectangular second housing 111 in plan view. Moreover, the large second reinforcement fittings 151L are all the same, and the small second reinforcement fittings 151S are all the same. Note that in the present embodiment, as illustrated in FIG. 2, an identifiable sign may be given depending on the disposed position for sake of convenience, and a description may be made using the sign. As illustrated in FIG. 2, in the state where the mating surface 111*a* of the second connector 101 faces the mating surface 11*a* of the first connector 1, the large second reinforcement fitting 151L and the small second reinforcement fitting 151S are disposed so as to face the large first reinforcement fitting 51L and the small first reinforcement fitting 51S of the first connector 1, respectively.

The second end wall covering part 152 includes an upper surface portion 152*a* that extends in the width direction of the second housing 111 and covers the upper surface 122*a* of the second protruding end part 122, an outer cover part 152*e* that extends downward from the outer edge of the second protruding end part 122 on the upper surface portion 152*a*, an engaging projection 152*f* that protrudes from the side edge of the outer cover part 152*e*, and connecting feet parts 152*g* at a lower end of the outer cover part 152*e*.

The second side wall covering part 153 includes an upper surface part 153*a* that extends in the longitudinal direction of the second housing 111 and covers the vicinity of the side edge of the upper surface of the second protruding end part 122, an outer cover portion 153*d* that extends downward from the side edge of the second side wall covering part 153 on the upper surface part 153*a*, and connecting feet parts 153*f* at the lower end of the outer cover portion 153*d*.

The outer cover part 152*e* and the outer cover portion 153*d* in the second reinforcement fitting 151 are inserted or press-fitted into the outer end recessed part 123*a* and the outer recessed part 123*e* of the second protruding end part 122 from the side of the mating surface 111*a* that is the upper surface (the surface in the Z-axis negative direction) of the second housing 111, and attached to the second housing 111. Note that the second reinforcement fitting 151 is not necessarily attached to the second housing 111 by insertion or press fit, and may be integrated with the second housing 111 by overmolding or insert molding. Here, for convenience of description, only the case in which the shield plate is attached to the second housing 111 by insertion or press fitting is described.

With the second reinforcement fitting 151 attached to the second housing 111, the upper surface portion 152*a* of the second end wall covering part 152 covers a majority of the upper surface of the second protruding end part 122, the outer cover part 152*e* is at least partially housed in the outer end recessed part 123*a*, the engaging projection enters into a part of the side surface of the outer end recess part 123*a* and engages therewith, and the lower surface of the connecting feet parts 152*g* is flush with or below the mounting surface 111*b*, that is, the lower surface (surface in the Z-axis positive surface) of the bottom plate 118 and is substantially flush with the lower surface of the tail part 162 of the second terminal 161. In addition, the upper surface part 153*a* of the second side wall covering part 153 covers the vicinity of the side edge of the upper surface of the second protruding end part 122, the outer cover portion 153*d* is at least partially housed in the outer recessed part 123*e*, the engaging projection enters into a part of the side surface of the outer recessed part 123*e* and engages therewith, and the lower surface of the connecting feet parts 153*f* is flush with or below the mounting surface 111*b* and is substantially flush with the lower surface of the tail part 162 of the second terminal 161.

As described above, since a majority of the surface of the second protruding end part 122 is covered with the second reinforcement fitting 151, the strength of the second protruding end part 122 increases, and even when a force or impact is applied to the second protruding end part 122 in the operation of fitting the first connector 1 and the second connector 101 together, damage or deformation of the second protruding end part 122 can be reliably prevented.

The upper surface portion 152*a* and the outer cover part 152*e* of the second end wall covering part 152 of the large second reinforcement fitting 151L extend toward the second sidewall part 112 on the opposite side, and the distal ends thereof are positioned beyond the center of the second housing 111 in the width direction and reach to a position similar to the distal end of the upper surface portion 52*a* of the first end wall cover 52 in the large first reinforcement fitting 51L of the first connector 1. Thus, as illustrated in FIG. 1, when the second connector 101 and the first connector 1 are mated together, the outer cover part 152*e* of the large second reinforcement fitting 151L faces the vertical arm 56*e* of the shield plate 56 disposed at the center of the first housing 11 in the width direction, and engages with and comes into contact with the engaging protrusions 56*f* of the vertical arm 56*e*.

Similar to the tail part 162 of the second terminal 161, the connecting feet parts 152*g* of the second end wall covering part 152 and the connecting feet parts 153*f* of the second side wall covering part 153 are connected to connection pads connected to the conductive trace of the second board by soldering or the like. As a result, similar to the second terminal 161, the outer cover portion 153*d* of the second reinforcement fitting 151 can also function as a terminal for transmitting current or an electrical signal or suitably as a ground terminal for connecting to ground lines. Therefore, the number of poles of the second connector 101 can be increased without increasing the number of second terminals 161, reducing the second connector 101 in size.

Subsequently, the operation of mating together the first connector 1 and the second connector 101 with the above configuration will be described.

Figure 9A:
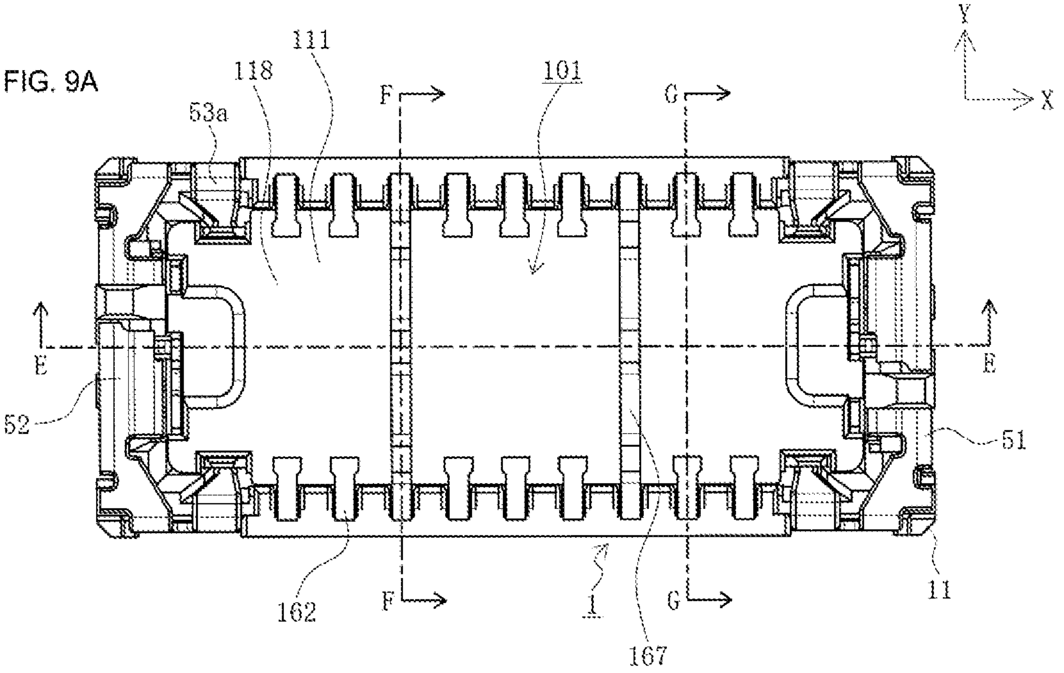
FIG. 9 is a plan view and cross-sectional view of the first connector and second connector of the present embodiment in a mated state, where (a) is a plan view, and (b) is a sectional view taken along the E-E line in (a).
Figure 9B:
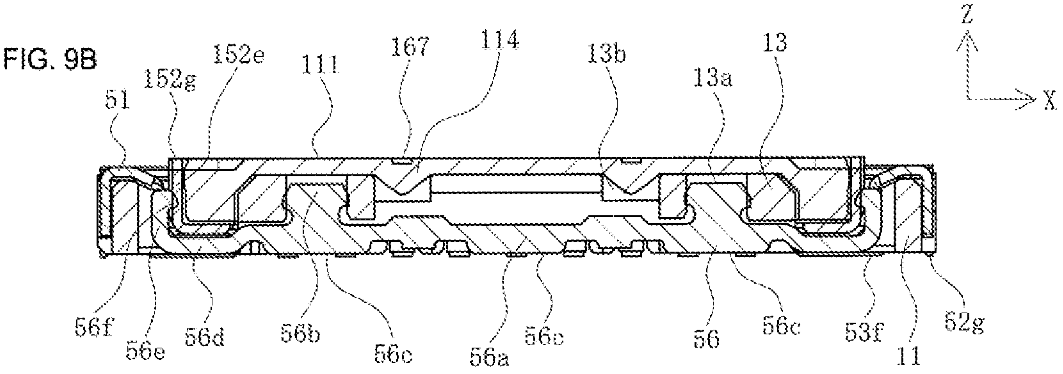
Figure 10A:
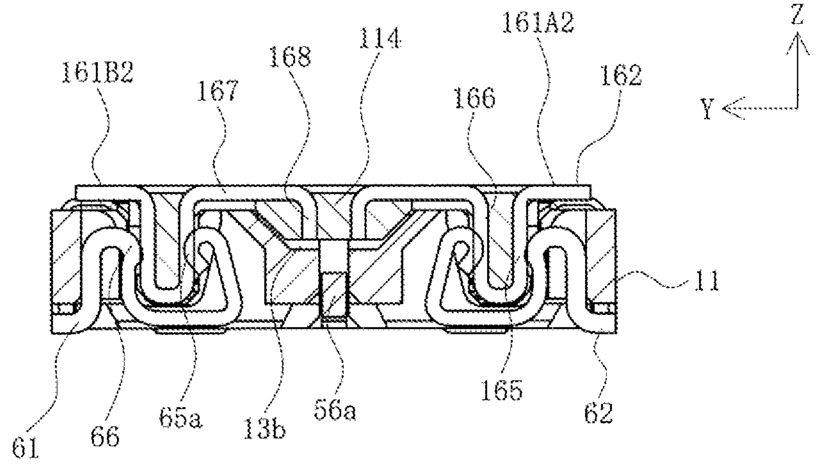
FIG. 10 is a cross-sectional view with the first connector and second connector of the present embodiment mated where (a) is a sectional view taken along the F-F line in FIGS. 9(*a*) and (*b*) is a sectional view taken along the G-G line in FIG. 9(*a*).
Figure 10B:
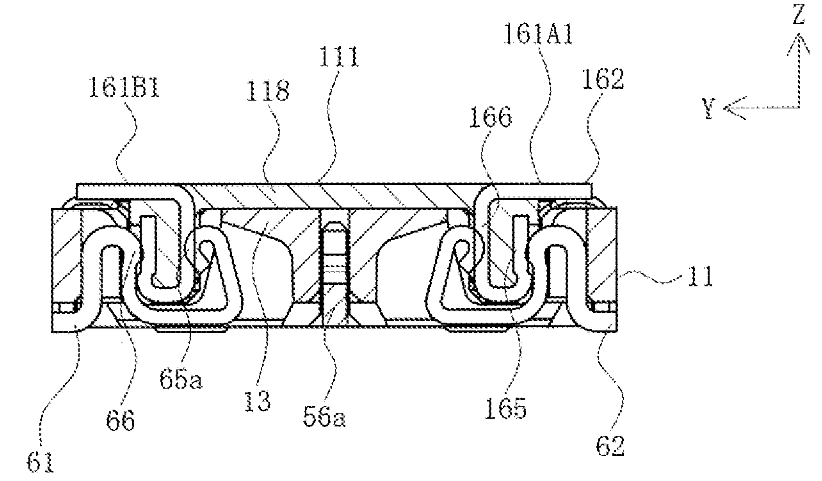
Figure 11:
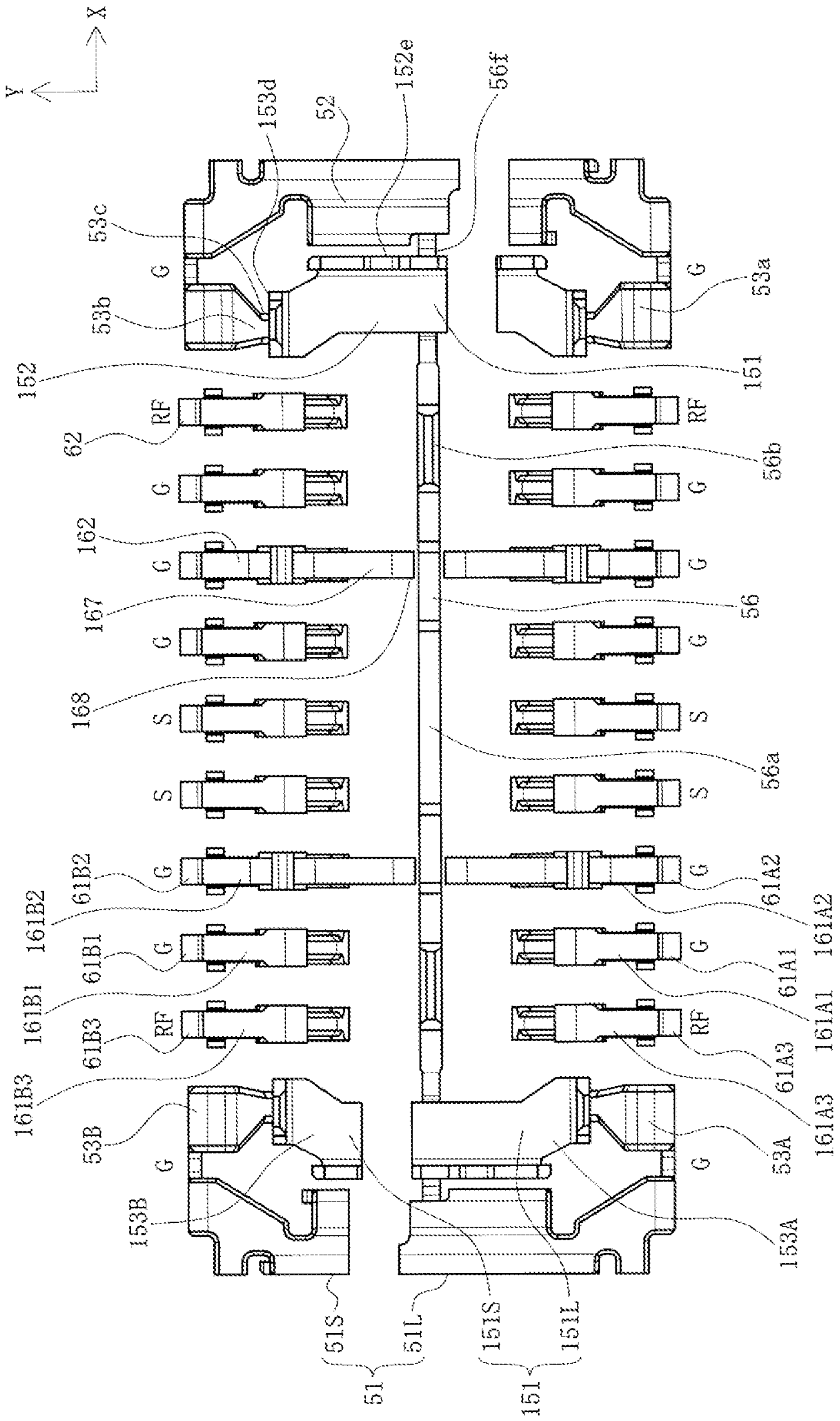
FIG. 11 is a plan view of the first connector and second connector of the present embodiment mated with the first housing and second housing omitted.
Figure 12:
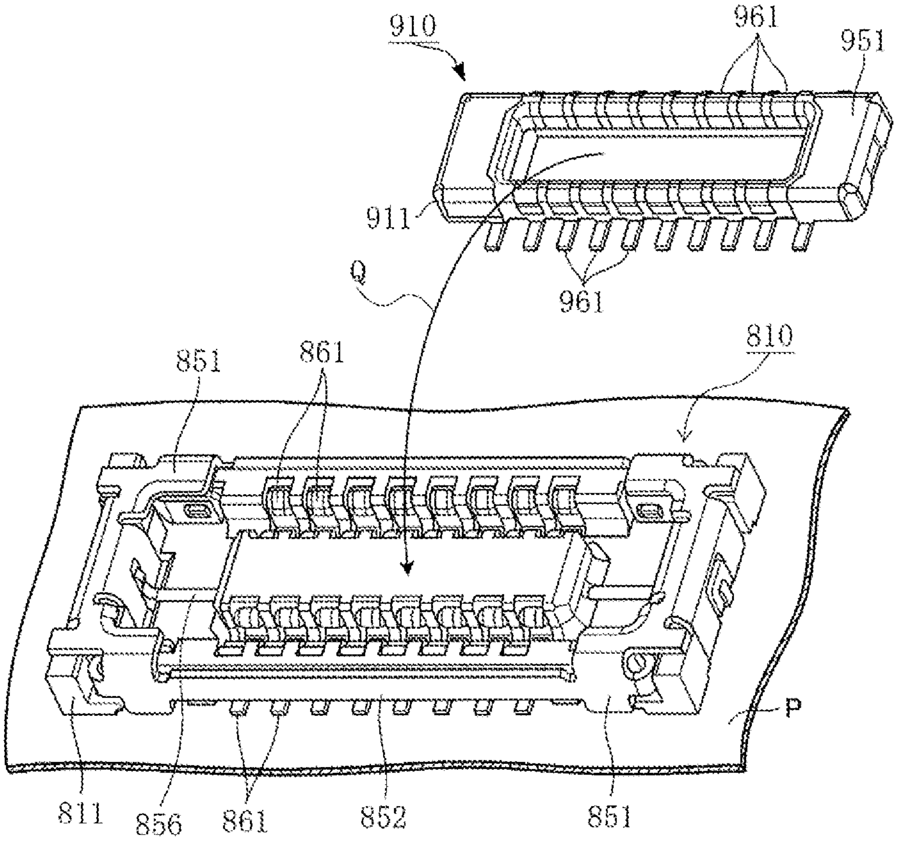
FIG. 12 is an exploded perspective view illustrating a conventional board to board connector prior to mating.

FIG. 9 is a plan view and cross-sectional view of a state in which the first connector and second connector of the present embodiment are mated. FIG. 10 is a cross-sectional view of a state in which the first connector and second connector of the present embodiment are mated. FIG. 11 is a diagram of a state in which the first connector and second connector of the present embodiment are mated and where the first housing and second housing are omitted in a plan view. In FIG. 9, (a) is a plan view, (b) is a sectional view taken along the line E-E in (a). In FIG. 10, (a) is a sectional view taken along the line F-F in FIGS. 9(*a*) and (*b*) is a sectional view taken along the line G-G in FIG. 9(*a*).

Here, regarding the first connector 1, the lower surface of the tail part 62 of the first terminals 61 is connected by solder to a connection pad connected to a conductive trace (not shown) of the first board. The lower surface of the connecting feet parts 52*g* of the first reinforcement fitting 51, first end wall cover 52, and connecting feet parts 53*f* of the first side wall cover 53 are connected by solder to a connection pad connected to a conductive trace of the first board. The lower surface of the connecting feet parts 56*c* of the shield plate 56 are connected by solder to the connection pad connected to a conductive trace of the first board. Thus, the first connector is surface-mounted to the first board. In a similar manner, the lower surface of the tail part 162 of the second terminals 161 are connected by solder to a connection pad connected to a conductive trace (not shown) of the second board. The connecting feet parts 152*g* of the second reinforcement fitting 151, second end wall covering part 152, and the connecting feet parts 153*f* of the second side wall covering part 153 are connected by solder to a connection pad connected to a conductive trace of the second board. The lower surface of the inner extending part 167 of the second terminal 161A2 and second terminal 161B2 in the second terminals 161 are connected by solder to a connection pad connected to a conductive trace of the second board. Thus, the second connector 101 is surface-mounted on the second board.

First, when an operator makes a mating surface 11*a* of the first housing 11 of the first connector 1 face the mating surface 111*a* of the second housing 111 of the second connector 101, the position of the second sidewall part 112 of the second connector 101 coincides with the position of the corresponding recessed groove part 12*a* of the first connector 1, while the position of the second protruding end part 122 of the second connector 101 coincides with the position of the corresponding mating recess 22 of the first connector 1, thereby completing the alignment between the first connector 1 and the second connector 101.

In this state, when the first connector 1 and/or the second connector 101 is moved in a direction approaching the counterpart, that is, in the fitting direction (Z-axis direction), the second sidewall part 112 and the second protruding end part 122 of the second connector 101 are inserted into the recessed groove part 12*a* and the mating recess 22 of the first connector 1. Consequently, as illustrated in FIG. 1 and FIG. 9, when the fitting between the first connector 1 and the second connector 101 is completed, the first terminal 61 and the second terminal 161 enter into a conduction state, and the first reinforcement fitting 51 and the second reinforcement fitting 151 enter into a conduction state.

Specifically, when the corresponding second terminal 161 is inserted between the inner contact part 65*a* and the outer contact part 66 of each first terminal 61, the inner contact part 65*a* of the first terminal 61 and the inner contact part 166 of the second terminal 161 come into contact with each other, and the outer contact part 66 of the first terminal 61 and the outer contact part 165 of the second terminal 161 come into contact with each other. As a result, since the first terminal 61 and the corresponding second terminal 161 come into contact with each other at two locations, that is, are in a so-called multiple contact state, even when one contact is separated due to shock or vibration, the conduction state can be maintained.

Furthermore, the contact protrusion 53*c* of the inclined elastic arm 53*b* of each first reinforcement fitting 51 engages and comes into contact with the outer cover portion 153*d* of the corresponding second reinforcement fitting 151. As a result, even when the first reinforcement fitting 51 and the corresponding second reinforcement fitting 151 are subjected to shock or vibration, the elastically displaceable contact protrusion 53*c* maintains contact with the outer cover portion 153*d* such that the conduction state can be maintained.

Furthermore, as illustrated in FIG. 9(*b*), the shield plate 56 is at least partially housed in the shield plate housing slit 13*a*, and the engaging protrusions 56*f* of the vertical arm 56*e* engage and come into contact with the outer cover part 152*e* of the large second reinforcement fitting 151L. As a result, the shield plate 56 and the large second reinforcement fitting 151L conduct with each other and become equipotential, and the large first reinforcement fitting 51L that comes into contact with the outer cover portion 153*d* of the large second reinforcement fitting 151L and the contact protrusion 53*c* of the inclined elastic arm 53*b*, and the shield plate 56 also become equipotential. Therefore, shielding properties are improved.

The first connector 1 and the second connector 101 in the present embodiment can be used as a connector assembly for connecting a conductive trace that transmits various currents to electrical signals. Here, the first terminals 61, second terminals 161, inclined elastic arm 53*b* of the first reinforcement fitting 51, and outer cover portion 153*d* of the second reinforcement fitting 151 have S, RF, and G indicating marks in FIG. 11. These are used for a normal signal terminal (S) connected to a normal signal line, a high frequency signal terminal (RF) connected to a high frequency signal line, and a ground terminal (G) connected to a ground line. Note that the shape of the tail part 62 of each of the first terminals 61 and the shape of the tail part 162 of each of the second terminals 161 can be selected as appropriate in accordance with the high-frequency signals used.

In this case, the first reinforcement fitting terminal 53A and first reinforcement fitting terminal 53B that are ground terminals (G) as well as the first terminal 61A1 and first terminal 61B1 are respectively positioned on both sides of the first terminal 61A3 and first terminal 61B3 that are high frequency signal terminals (RF). Also, the second reinforcement fitting terminal 153A and second reinforcement fitting terminal 153B that are ground terminals (G) as well as the second terminal 161A1 and second terminal 161B1 are positioned respectively on both sides of the second terminal 161A3 and second terminal 161B3 that are high frequency signal terminals (RF). Therefore, it is as if a pseudo waveguide centered on the first terminal 61A3 and the second terminal 161A3, and a pseudo waveguide centered on the first terminal 61B3 and the second terminal 161B3 are formed. Thus, the high frequency signals are transmitted without being affected by noise from the outside and without causing noise externally.

Further, in a plan view, the high frequency signal terminals (RF) positioned on the right side and the left side in the width direction (Y-axis direction) of the first connector 1 and the second connector 101 are arranged symmetrically with the centerline of the first connector 1 and second connector 101 in the width direction as an axis of symmetry and are facing each other with the shield plate 56 that extends along said centerline interposed therebetween. In this manner, by interposing of the shield plate 56 connected to a ground line in between the mutually facing high frequency signal terminals (RF), they become less likely to interfere with each other, reducing crosstalk.

Furthermore, each of the rows of the second terminals 161 arranged on the second sidewall part 112 of the second connector 101 includes two second terminals 161A2 and two second terminals 161B2 that are arranged more toward the center of the second connector 101 in the longitudinal direction than the high frequency signal terminals (RF). The second terminal 161A2 and second terminal 161B2 respectively extend from the bottom of the inner contact part 166 toward the inside of the second housing 111 in the width direction and include an inner extending part 167 close to the centerline of the second connector 101 in the width direction at the tip thereof. Furthermore, the bottom surface of the inner extending part 167 is connected by solder to a connection pad connected to a conductive trace as a ground line of the second board. As a result, the two high-frequency signal terminals (RF) in each of the right and left-side rows of the first terminals 61 and second terminals 161 are connected to the ground line between the two high frequency signal terminals (RF) in the width direction of the first connector 1 and the second connector 101. In addition, two inner extending parts 167 extending in the width direction of the first connector 1 and second connector 101 over a wide range reduce crosstalk by making it difficult to interfere with each other.

Furthermore, the high frequency signal terminal (RF) near a first end of a first row of the first connector 1 and second connector 101 in the width direction and the high frequency signal terminal (RF) near a second end of a second row, in other words, in plan view, the shield plate 56 and two inner extending parts 167 are provided on the pseudo diagonal as a straight line connecting the high frequency signal terminals (RF) positioned near the diagonal of the first connector 1 and second connector 101. As a result, as the shield plate 56 and two inner extending parts 167 are interposed between the high frequency signal terminals (RF) positioned near the diagonal of the first connector 1 and second connector 101, crosstalk is reduced.

In addition, as illustrated in FIG. 9(*b*), the shield plate 56 is an elongated member extending in the longitudinal direction of the first connector 1 and the second connector 101. However, as illustrated in FIG. 5, the bottom surface of the plurality of connecting feet parts 56*c* that are provided discretely over a wide area in the longitudinal direction are connected by solder to a connection pad connected to a conductive trace as a ground line on the first board. In addition, engaging protrusions 56*f* on both ends of the vertical arm 56*e* in the longitudinal direction are in contact with the outer cover part 152*e* of the second reinforcement fitting 151 connected to a conductive trace as a ground line of the second board and conducts so the electrical path length to a ground line for the shield plate 56 is short for all of the parts. As a result, since the shield plate 56 can exhibit high shielding properties, the high frequency signal terminals (RF) are less likely to interfere with each other, and crosstalk is reduced.

Furthermore, the second terminal 161A2 and the second terminal 161B2 used only as ground terminals are elongated members extending in the width direction of the first connector 1 and the second connector 101 as illustrated in FIG. 10 (*a*). However, as illustrated in FIG. 8, the lower surface of the inner extending part 167 and tail part 162 present over a wide area in the longitudinal direction (width direction of the first connector 1 and second connector 101) is connected by solder to a connection pad connected to a conductive trace as a ground line of the second board and is connected to the first terminals 61 connected to a conductive trace as a ground line of the first board in between the inner extending part 167 and tail part 162 at two locations of the inner contact part 166 and outer contact part 165 and conducts so the electrical path length to a ground line for all points of the second terminal 161A2 and second terminal 161B2 is short. Also, the electrical path length from the location in contact with the first terminal 61 in the inner contact part 166 and the outer contact part 165 is also shortened. As a result, since the second terminal 161A2 and second terminal 161B2 can exhibit high shielding properties, the high frequency signal terminals (RF) are less likely to interfere with each other, and crosstalk is reduced.

Furthermore, since the inner extending part 167 is larger in dimension in the width direction of the second connector 101 than the tail part 162, the second terminal 161A2 and the second terminal 161B2 used as the ground terminals can increase the area connected by solder to a connection pad that is connected to a conductive trace as a ground line of the second board as compared to the second terminal 161A1 and the second terminal 161B1 used as ground terminals without changing the overall dimensions (spacing between outer edges of the tail parts 162) in the width direction of the second connector 101 and thus the electrical path length to a ground line can be shortened for all parts. As a result, the second terminal 161A2 and the second terminal 161B2 can improve the shielding properties without increasing the dimension in the width direction of the second connector 101, and thus the high frequency signal terminals (RF) can be less likely to interfere with each other, making it possible to reduce crosstalk.

Note that the present disclosure is not necessarily limited to this example, and the type of conductive trace connected to each of the first terminal 61, the first reinforcement fitting 51, the second terminal 161, and the second reinforcement fitting 151 can be changed as appropriate. Also, the number of the first terminals 61 and the second terminals 161 can also be changed, for example, use of only one second terminal 161A2 and second terminal 161B2 that are used as a ground terminal included in the row of the second terminal 161 arranged in the second sidewall part 112 of the second connector 101 is feasible, or there may be three or more. Note that a higher number of the second terminals 161A2 and second terminals 161B2 lead to more effectively reducing crosstalk.

Thus, in the present embodiment, the second connector 101 includes the second housing 111 and the second terminals 161 mounted in the second housing 111 and mates with the first connector 1. Furthermore, the second housing 111 includes a recessed groove part 113 and a second sidewall part 112 that extends in the longitudinal direction of the second housing 111 and demarcates both sides of the recessed groove part 113. A plurality of second terminals 161 are arranged along each of the second sidewall parts 112 forming a pair of parallel terminal group rows. The second terminal 161A1 and second terminal 161B1 as well as the second terminal 161A2 and second terminal 161B2 that are included in each terminal group row and function as ground terminals are arranged in a mutually facing position. The second terminal 161A2 and second terminal 161B2 that are one of the ground terminals included in each terminal group row include the inner extending part 167 positioned inside the second housing 111 in the width direction and the tail part 162 positioned outside the second housing 111 in the width direction. The inner extending part 167 positioned to the inside is longer than the tail part 162 positioned on the outside.

Therefore, the second terminal 161A2 and the second terminal 161B2, which are ground terminals, extend over a wide range in the width direction of the second housing 111. In addition, the tail part 162 and the inner extending part 167 that is longer than this tail part 162 are connected by solder to a connection pad connected to a conductive trace as a ground line of the second board. Therefore, the shielding effect can be improved without expanding the dimension of the second connector 101 in the width direction, crosstalk can be reliably reduced, and reliability improved.

In addition, the second connector 101 further includes a second reinforcement fitting 151 mounted to the second housing 111. Regarding the longitudinal direction of the second housing 111, the second reinforcement fitting 151 functions as a ground terminal positioned on the outside at both ends of each terminal group row and the second terminals 161A3 and 161B3 positioned at both ends of the terminal group row are high frequency signal terminals. Furthermore, as viewed in the longitudinal direction of the second housing 111, the second terminal 161 has a winding shape that advances from the outside toward the inside of the second housing 111 in the longitudinal direction. The second terminal 161A2 and second terminal 161B2 have a different winding shape and winding direction than the other second terminals 161 included in each terminal group row. Furthermore, the first connector 1 includes the first housing 11, the first terminals 61 mounted in the first housing 11 and a shield plate 56. The first housing 11 includes a pair of first side wall parts 14 that extend in the longitudinal direction of the first housing 11. A plurality of first terminals 61 are arranged along each first side wall part 14 forming a pair of parallel terminal group rows. The shield plate 56 extends in the longitudinal direction of the first housing 11 and is positioned between the terminal group rows. Furthermore, in a state with the first connector 1 and second connector 101 mated, when viewed in the longitudinal direction of the first housing 11 and second housing 111, the shield plate 56 is positioned between mutually facing inner extending parts 167 that are positioned inside the second housing 111 in the width direction.

Note that the disclosure herein describes features relating to suitable exemplary embodiments. Various other embodiments, modifications, and variations within the scope and spirit of the claims appended hereto will naturally be conceived of by those skilled in the art upon review of the disclosure herein.

The present disclosure can be applied to a connector.

The invention claimed is:

1. A connector which mates with a mating connector, comprising:

a connector body including a recessed groove part and a pair of side wall parts extending in a longitudinal direction of the connector body, arranged in parallel demarcating both sides of the recessed groove part; and a plurality of terminals arranged along each wall forming a pair of terminal group rows in parallel, wherein at least one of the terminals in each terminal group row is a ground terminal, wherein the at least one ground terminal in each terminal group row are arranged in respective mutually facing positions, each ground terminal includes a board connecting part positioned on an inside of the connector body and which extends in a width direction of the connector body and a board connecting part positioned on an outside of the connector body and which extends in the width direction, and wherein the board connecting part positioned on the inside is longer than the board connecting part positioned on the outside in each ground terminal.

2. The connector according to claim 1, wherein the terminals positioned on both ends of each terminal group row are high frequency signal terminals; and further comprising a reinforcement fitting mounted on the connector body, the reinforcement fitting functioning as a ground terminal positioned on both ends of each terminal group row with regard to the longitudinal direction of the connector body.

3. The connector according to claim 2, wherein two ground terminals are provided in each terminal group row.

4. The connector according to claim 3, wherein at least one of the terminals in each terminal group row is a normal signal terminal.

5. The connector according to claim 4, wherein at least one of the terminals in each terminal group row is a power supply terminal.

6. The connector according to claim 3, wherein at least one of the terminals in each terminal group row is a power supply terminal.

7. The connector according to claim 1, wherein when viewed in the longitudinal direction of the connector body, each terminal has a winding shape that proceeds from the outside of the connector body in the width direction towards the inside of the connector body and then winds around, and the ground terminals have a different winding direction of the winding shape than other terminals included in the terminal group row.

8. The connector according to claim 1, in combination with the mating connector which includes a mating connector body, a mating terminal attached to the mating connector body, and a mating shield member, the mating connector body including a pair of mating connector side wall parts extending in a longitudinal direction of the mating connector body, a plurality of mating terminals are arranged along each of the mating connector side wall parts and are formed in a parallel pair of mating terminal group rows, and the mating shield member extends in a longitudinal direction of the mating connector body and is positioned between the mating terminal group rows.

9. The connector according to claim 8, wherein the mating shield member is positioned between connecting parts positioned on the inside of the connector body when the connector and mating connector are mated.

10. The connector according to claim 1, wherein at least one of the terminals in each terminal group row is a normal signal terminal.

11. The connector according to claim 10, wherein at least one of the terminals in each terminal group row is a power supply terminal.

12. The connector according to claim 1, wherein at least one of the terminals in each terminal group row is a power supply terminal.

13. The connector according to claim 1, wherein two ground terminals are provided in each terminal group row.

14. The connector according to claim 13, wherein at least one of the terminals in each terminal group row is a normal signal terminal.

15. The connector according to claim 14, wherein at least one of the terminals in each terminal group row is a power supply terminal.

16. The connector according to claim 15, wherein at least one of the terminals in each terminal group row is a power supply terminal.

* * * * *